(12) United States Patent
Hattori et al.

(10) Patent No.: US 8,437,067 B2
(45) Date of Patent: May 7, 2013

(54) ELECTROCHEMICAL DISPLAY ELEMENT

(75) Inventors: Takamune Hattori, Tokyo (JP); Osamu Ishige, Kanagawa (JP); Takeshi Hakii, Kanagawa (JP)

(73) Assignee: Konica Minolta Holdings, Inc., Tokyo (JP)

( * ) Notice: Subject to any disclaimer, the term of this patent is extended or adjusted under 35 U.S.C. 154(b) by 244 days.

(21) Appl. No.: 12/921,537

(22) PCT Filed: Feb. 23, 2009

(86) PCT No.: PCT/JP2009/053173
§ 371 (c)(1),
(2), (4) Date: Sep. 8, 2010

(87) PCT Pub. No.: WO2009/116353
PCT Pub. Date: Sep. 24, 2009

(65) Prior Publication Data
US 2011/0013261 A1   Jan. 20, 2011

(30) Foreign Application Priority Data
Mar. 18, 2008  (JP) .................................. 2008-069143

(51) Int. Cl.
*G02F 1/15* (2006.01)
*G02B 5/02* (2006.01)

(52) U.S. Cl.
USPC .......................................... 359/265; 252/582

(58) Field of Classification Search .......... 359/265–277, 359/245–247, 254, 242; 345/49, 105; 250/70; 438/929; 252/581–583, 586
See application file for complete search history.

(56) References Cited

U.S. PATENT DOCUMENTS

| | | | |
|---|---|---|---|
| 4,240,716 A | 12/1980 | Camlibel et al. | |
| 7,253,940 B2 | 8/2007 | Fitzmaurice et al. | |
| 7,619,803 B2 * | 11/2009 | Kokeguchi et al. | 359/265 |
| 2007/0002423 A1 | 1/2007 | Yale et al. | |

FOREIGN PATENT DOCUMENTS

| | | |
|---|---|---|
| JP | 3428603 | 5/2003 |
| JP | 2003241227 | 8/2003 |
| JP | 2007508587 | 4/2007 |
| JP | 2007298713 | 11/2007 |
| JP | 2008145598 | 6/2008 |
| WO | 2004067673 | 8/2004 |
| WO | 2004068231 | 8/2004 |
| WO | WO 2006/129424 | * 12/2006 |
| WO | 2008117871 | 10/2008 |

OTHER PUBLICATIONS

Y. Demizu et al., Efficient oxidation of alcohols electrochemically mediated by azabicyclo-N-oxyls, Tetrahedron Letters, 2008.01, vol. 49, Issue 1, pp. 48-52.
Mendenhall, G.D., et al., Reactions of Bicyclic Nitroxides Involving Reduction of the NO Group, Journal of the American Chemical Society, Sep. 19, 1973, vol. 95/No. 19, p. 6395-6400.

* cited by examiner

*Primary Examiner* — Tuyen Tra
(74) *Attorney, Agent, or Firm* — Lucas & Mercanti, LLP

(57) ABSTRACT

Provided is an electrochemical display element composed of a simple member structure, capable of driving at low voltage, and exhibiting high display contrast and white display reflectance, and further to provide the electrochemical display element exhibiting reduced variation in reflectance during repetitive driving even after storage for a long duration. Disclosed is an electrochemical display element possessing an N-oxyl derivative represented by the following Formula (1), an electrolyte and a pair of facing electrodes:

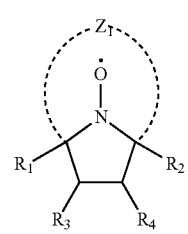

Formula (1)

wherein each of $R_1$, $R_2$, $R_3$ and $R_4$ independently represents an aliphatic hydrocarbon group, an aromatic hydrocarbon group or a heterocyclic group, which may have a hydrogen atom or a substituent; $Z_1$ represents a group of atoms having 2 or 3 atoms to form a cyclic structure; and $Z_1$ may also have a substituent.

5 Claims, No Drawings

ELECTROCHEMICAL DISPLAY ELEMENT

This is a 371 of PCT/JP2009/053173 filed Feb. 23, 2009 which in turn claimed he priority of Japanese Patent Application No. 2008-069143 filed Mar. 18, 2008, both applications are incorporated by reference herein.

TECHNICAL FIELD

The present invention relates to an electrochemical display element exhibiting excellent durability together with high contrast, and specifically to a novel electrochemical display element enabling multicolor display with a single layer structure.

BACKGROUND

Recently, along with enhancement of the operating speed of personal computers, the spread of network infrastructure, and increased and lower-priced mass storage, data of documents or image, which were conventionally printed on paper, can be received simply as electronic information so that opportunities to read such electronic information have increased dramatically.

There were used, as a means for reading electronic information, conventional liquid crystal displays or CRTs and recent emission type displays, such as organic electroluminescence displays. Specifically, when electronic data is document data, it is necessary to notice this reading means over a relatively long period of time. It is hard to say that such an action is a kindly means to humans. There are generally known disadvantages of emission type displays such that flickering tires human eyes, they are awkward to carry about, the reading posture is restricted, it is necessitated to gaze at a stationary picture plane, and electric power consumption increases when reading over a long time.

As a display means to redeem the foregoing disadvantages is known a (memory type) reflective display which employs external light and does not consume electrical power for image retention. However, based on the reasons below, it is hard to say that such displays provide sufficient performance.

For instance, a system using a polarizing plate such as a reflective liquid crystal display exhibits a relatively low reflectance of up to 40%, resulting in difficulty in displaying whiteness and methods of preparing constituent members are not necessarily simple. A polymer dispersed liquid crystal display requires a relatively high voltage and employment of the difference in refractive index between organic compounds does not result in images with sufficient contrast. A polymer networked liquid crystal display has problems such that it requires a relatively high voltage and a complex TFT circuit to enhance memory. An electrophoretic display element needs relatively high voltage of more than 10 V, and there is a concern of durability of the electrophoretic particles, due to their tendency to coagulate.

There are known, as a display system to overcome these disadvantages of the foregoing systems, an electrochromic display element (hereinafter, denoted as EC system), and an electrodeposition (hereinafter, denoted as ED system) system utilizing dissolution and deposition of metals or metal salts. The EC system enabling full color display at a low voltage of not more than 3 V exhibits advantages such as simple cell configuration and excellent while color quality. The ED system, which can be driven at a relatively low voltage of not more than 3 V, also exhibits advantages such as simple cell configuration and being superior in black and white contrast as well as in black color quality. There are disclosed various methods (refer to Patent Documents 1-5, for example).

After considerable effort during detailed studies concerning techniques disclosed in each of the above-described Patent Documents, the inventors have found out that stability in reflectance during repeatedly driving causes a problem in the case of conventional techniques. As the means to solve this problem, provided are a method of adding a ferrocene series compound into an electrolyte as a redox buffering agent (refer to Patent Document 6, for example), a method of fixing a redox promoter or the like on an electrode (refer to Patent Document 7, for example) and a method in which a radical polymer is utilized (refer to Patent Document 6, for example), but in order to meet high requirement specification desired from users in recent years, further improvement should be made.

Patent Document 1: WO No. 2004/068231
Patent Document 2: WO No. 2004/067673
Patent Document 3: U.S. Pat. No. 4,240,716
Patent Document 4: Japanese Patent No. 3428603
Patent Document 5: Japanese Patent Open to Public Inspection (O.P.I.) Publication No. 2003-241227
Patent Document 6: Published Japanese Translation of PCT International Publication No. 2007-508587
Patent Document 7: U.S. Pat. No. 7,253,940
Patent Document 8: Japanese Patent O.P.I. Publication No. 2007-298713

DISCLOSURE OF THE INVENTION

Problems to be Solved by the Invention

The present invention has been made on the basis of the above-described situation, and it is an object of the present invention to provide an electrochemical display element composed of a simple member structure, capable of driving at low voltage, and exhibiting high display contrast and high white display reflectance, and further to provide the electrochemical display element exhibiting reduced variation in reflectance during repetitive driving even after storage for a long duration.

Means to Solve the Problems (Structure 1) An electrochemical display element comprising an N-oxyl derivative represented by the following Formula (1), an electrolyte and a pair of facing electrodes:

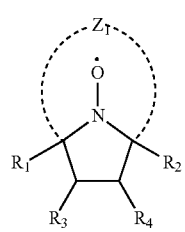

Formula (1)

wherein each of $R_1$, $R_2$, $R_3$ and $R_4$ independently represents an aliphatic hydrocarbon group, an aromatic hydrocarbon group or a heterocyclic group, which may have a hydrogen atom or a substituent; $Z_1$ represents a group of atoms having 2 or 3 atoms to form a cyclic structure; and $Z_1$ may also have a substituent.

(Structure 2) The electrochemical display element of Structure 1, wherein the N-oxyl derivative is immobilized on at least one of the pair of facing electrodes.

(Structure 3) The electrochemical display element of Structure 1 or 2, further comprising a compound represented by the following Formula (L) to conduct a white display or a colored display via driving operation of the pair of facing electrodes:

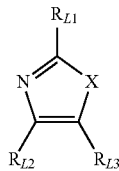

Formula (L)

wherein $R_{L1}$ represents a substituted or unsubstituted aryl group; each of $R_{L2}$ and $R_{L3}$ represents a hydrogen atom or a substituent; and X represents —N($R_{L4}$)—, an oxygen atom or a sulfur atom, wherein $R_{L4}$ represents a hydrogen atom or a substituent.

(Structure 4) The electrochemical display element of any one of Structures 1-3, comprising a metal salt compound reversibly dissolved and deposited in the electrolyte via electrochemical redox reaction, and the compound represented by Formula (L) to conduct a black display, a white display or a colored display other than black via driving operation of the pair of facing electrodes.

(Structure 5) The electrochemical display element of Structure 4, wherein the metal salt compound is a silver salt compound.

EFFECT OF THE INVENTION

In the present invention, provided can be an electrochemical display element composed of a simple member structure, capable of driving at low voltage, and exhibiting high display contrast and high white display reflectance, and further provided can be the electrochemical display element exhibiting reduced variation in reflectance during repetitive driving even after storage for a long duration.

DESCRIPTION OF THE PREFERRED EMBODIMENTS

The present invention will be further described in detail. The inventors found out that an N-oxyl derivative having an azabicycloalkane moiety worked more effectively than a conventional N-oxyl derivative even in the case of the N-oxyl derivative having an addition amount smaller than that of the conventional N-oxyl derivative. By this findings, coloring from an N-oxyl derivative itself was suppressed, and reflectance during white display was improved. At the same time, it was also found out that when the N-oxyl derivative having an azabicycloalkane moiety was used, stability in reflectance during repetitive driving was not deteriorated even after storage for a long duration. It appears that this is to be originated by stability of the azabicycloalkane moiety.

<<Basic Structure of Electrochemical Display Element>>

In an electrochemical display element, there provided a pair of facing electrodes in a display section. A transparent electrode such as an ITO electrode or the like as electrode 1 for one of electrodes located close to the display section is provided, and on the other hand, a conductive electrode as electrode 2 is provided. An electrolyte and an electrochromic compound in the present invention, a white scattering material, and a N-oxyle derivative are contained between electrode 1 and electrode 2. White and various colored states are reversibly changeable via coloration•decoloration reaction caused by redox of an electrochromic dye by applying a voltage of positive polarity or negative polarity between a pair of facing electrodes.

As a preferred embodiment, a metal salt reversibly dissolved and deposited via electrochemical redox reaction is contained between a pair of facing electrodes. In this embodiment, a black display or a white display is conducted in response to dissolution and deposition of a metal salt by applying a voltage of positive polarity or negative polarity between a pair of facing electrodes, and black, white and a colored state other than black are reversibly changeable in response to coloration•decoloration reaction caused by redox of an electrochromic compound.

In the preferred embodiment of the present invention, an electrochromic compound is immobilized on transparent electrode 1 on the display side.

<<Electrode>>

—Display Electrode—

As to an electrochemical display element of the present invention, a transparent electrode among a pair of facing electrodes is used on a display section side. Transparent electrodes are not particularly limited as long as they are transparent and electrically conductive. Examples thereof include indium tin oxide (ITO), indium zinc oxide (IZO), fluorine-doped tin oxide (FTO) indium oxide, zinc oxide, platinum, gold, silver rhodium, copper, chromium, carbon, aluminum, silicon, amorphous silicon, and BSO (bismuth silicon oxide). Such electrodes as described above can be formed, for example, in the manner that an ITO layer may be subjected to mask evaporation on a substrate employing a sputtering method, or after forming an ITO layer on the entire surface, patterning may be performed employing a photolithographic method. The surface resistance value is preferably 100Ω/□ or less, and is more preferably 10Ω/□ or less. The thickness of the transparent electrodes is not particularly limited, but is commonly 0.1-20 μm.

—Semiconductor Nanoporous Layer—

A semiconductor nanoporous layer may be formed on the transparent electrode on the display section side to immobilize a dye or the like. The semiconductor nanoporous layer has fine pores capable of holding an EC dye, on its surface and inside it. The semiconductor nanoporous layer preferably has a specific surface area of 1-5000 m²/g, and more preferably has a specific surface area of 10-2500 m²/g. Herein, such a specific surface area means a BET specific surface area determined from the adsorbed amount of nitrogen gas. The adsorbed amount of EC dye can be increased by increasing the specific surface area, and the intended purpose in the present invention can be achieved.

Semiconductor particles contained in the foregoing semiconductor nanoporous layer are not specifically limited, and can be appropriately selected in accordance with the intended purpose. Examples thereof include simple semiconductors, oxide semiconductors, compound semiconductors, organic semiconductors, composite oxide semiconductors, and mixtures thereof. Any of these may contain impurities as a dopant. Incidentally, the form of such a semiconductor is not specifically limited, and may be single-crystalline, polycrystalline, amorphous, or in a mixed form thereof.

As the foregoing semiconductor particles, oxide semiconductor particles are preferable. Oxide semiconductors are metal oxides exhibiting semiconductor properties. Examples thereof include $TiO_2$, $SnO_2$, $Fe_2O_3$, $SrTiO_3$, $WO_3$, ZnO, ZrO$_2$, Ta$_2$O$_5$, Nb$_2$O$_5$, V$_2$O$_5$, In$_2$O$_3$, CdO, MnO, CoO, TiSrO$_3$, KTiO$_3$, Cu$_2$O, sodium titanate, barium titanate, potassium niobate and so forth.

The shape of the semiconductor particles is not specifically limited, and can be appropriately selected in accordance with the intended purpose. Any of the spherical, nanotube, rod, whisker shapes is employable. At least 2 types of particles differing in shape can be mixed. The foregoing spherical particles preferably have an average particle diameter of 0.1-1000 nm, and more preferably have an average particle diameter of 1-100 nm. In addition, at least 2 types of particles differing in particle diameter distribution may be mixed. Further, the rod-shaped particles preferably have an aspect ratio of 2-50000, and more preferably have an aspect ratio of 5-25000.

—Facing Electrode—

A metal electrode or a carbon electrode is used as an electrode facing on the display section side for an electrochemical display element of the present invention.

As the metal electrode, usable are commonly known metals such as platinum, gold, silver, copper, aluminum, zinc, nickel, titanium, bismuth, and their alloys. As metal electrodes, preferable are those having a work function close to the oxidation-reduction potential of silver in an electrolyte. Of these, a silver electrode or an electrode composed of silver in an amount of at least 80% is advantageous to maintain a reduced state of silver, and further, inhibition of electrode contamination is also excellent. Usable examples of the method of preparing an electrode include conventional methods such as a evaporation method, a printing method, an ink-jet method, a spin coating method, and a CVD method.

As a carbon electrode, a porous carbon electrode is preferable. Examples of adsorption-supportable porous carbon electrodes include graphite, non-graphitizable carbon, graphitizable carbon, composite carbon, and carbon compounds obtained via calcination after doping boron, nitrogen, phosphorus or the like in carbon. As the structure of carbon particles, a mesophase spherule and a fiber-shaped graphite are provided. The mesophase spherules can be obtained by burning coal tar pitch at 350-500° C., and an excellent porous carbon electrode can be obtained by graphitizing them via classification and calcination at high temperature. Further, a pitch-based carbon fiber, a PAN-based carbon fiber, a vapor phase growth fiber, and fibrous carbon can be obtained.

[N-oxyl Derivative]

The N-oxyl derivative of the present invention serves as a mediator of electrodeposition reaction or electrochromic reaction, or as a reactant of the opposite polarity. When the N-oxyl derivative of the present invention serves as a mediator, it is preferred that there appears the same polar activation as that of the electrodeposition reaction or the electrochromic reaction, and when the N-oxyl derivative of the present invention serves as a reactant of the opposite polarity, it is preferred that there appears the different polar activation from that of the electrodeposition reaction or the electrochromic reaction.

The N-oxyl derivative of the present invention may be contained in an electrolyte, or may be immobilized on the surface of an electrode. Examples of the method of immobilizing it on the surface of an electrode include a method by which a group chemically or physically adsorbed onto the surface of an electrode is introduced into an N-oxyl derivative, and another method by which a thin film is formed on the surface of an electrode after polymerizing an N-oxyl derivative. In addition, the N-oxyl derivative may be added in a state of an N-oxyl radical, and may be also added in the form of an N-hydroxy compound or an oxoammonium ion compound.

[Explanation of Formula (1)]

In Formula (1), each of $R_1$, $R_2$, $R_3$ and $R_4$ independently represents an aliphatic hydrocarbon group, an aromatic hydrocarbon group or a heterocyclic group, which may have a hydrogen atom or a substituent. $Z_1$ represents a group of atoms having 2 or 3 atoms to form a cyclic structure. The preferred group of atoms is a group of atoms selected from carbon atoms, oxygen atoms, sulfur atoms and nitrogen atoms, and carbon atoms are specifically preferable. Further, the group of atoms may have a substituent. These substituents are not specifically limited, but the following substituents are cited, for example. Provided can be an alkyl group (for example, a methyl group, an ethyl group, a propyl group, an isopropyl group, a t-butyl group, a pentyl group or a hexyl group), a cycloalkyl group (for example, a cyclohexyl group or a cyclopentyl group), an alkenyl group, a cycloalkenyl group, an alkynyl group (for example, a propargyl group), a glycidyl group, an acrylate group, a methacrylate group, an aromatic group (for example, a phenyl group, a naphthyl group or an anthracenyl group), a heterocyclic group (for example, a pyridyl group, a thiazolyl group, an oxazolyl group, an imidazolyl group, a furyl group, a pyrrolyl group, a pyrazinyl group, a pyrimidinyl group, a pyridazinyl group, a selenazolyl group, a sulfolanyl group, a piperidinyl group, a pyrazolyl group or a tetrazolyl group), an alkoxy group (for example, a methoxy group, an ethoxy group, a propyloxy group, a pentyloxy group, a cyclopentyloxy group, a hexyloxy group or a cyclohexyloxy group), an aryloxy group (for example, a phenoxy group), an alkoxycarbonyl group (for example, a methyloxycarbonyl group, an ethyloxycarbonyl group or a butyloxycarbonyl group), an aryloxycarbonyl group (for example, a phenyloxycarbonyl group), a sulfonamide group (for example, a methane sulfonamide group, an ethane sulfonamide group, a butane sulfonamide group, a hexane sulfonamide group, a cyclohexane sulfonamide group or a benzene sulfonamide group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, a phenylaminosulfonyl group or a 2-pyridylaminosulfonyl group), a urethane group (for example, a methylureide group, an ethylureide group, a pentylureide group, a cyclohexylureide group, a phenylureide group or a 2-pyridylureide group), an acyl group (for example, an acetyl group, a propionyl group, a butanoyl group, a hexanoyl group, a cyclohexanoyl group, a benzoyl group or a pyridinoyl group), a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, a phenylaminocarbonyl group or a 2-pyridylaminocarbonyl group), an acylamino group (for example, an acetylamino group, a benzoylamino group or a methylureide group), an amide group (for example, an acetamide group, a propionamide group, a butanamide, a hexanamide or a benzamide group), a sulfonyl group (for example, a methylsulfonyl group, an ethylsulfonyl group, a butylsulfonyl group, a cyclohexylsulfonyl group a phenylsulfonyl group or a 2-pyridylsulfonyl group), a sulfonamide (for example, a methylsulfonamide group, an octylsulfonamide group, a phenylsulfonamide group or a naphthylsulfonamide group), an amino group (for example, an amino group, an ethylamino group, a dimethylamino group, a butylamino group, a cyclopentylamino group, an anilino group or a 2-pyridylamino group), a halogen atom (for example, a chlorine atom, a bromine atom or an iodine atom), a cyano group, a nitro group, a sulfo group, a carboxyl group, a hydroxyl group or a phosphono group (for example, a phosphonoethyl group, a phosphonopropyl group or a phosphonooxyethyl group). These groups may further be substituted by any of these ones.

$R_1$, $R_2$, $R_3$ and $R_4$ each preferably represent a hydrogen atom or an alkyl group having 1-4 carbon atoms, and more preferably represent a hydrogen atom or a methyl group.

Specific compound examples of the N-oxyl derivative represented by Formula (1) are shown below, but the present invention is not limited only to these exemplified compounds.

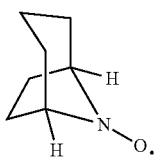
B-1

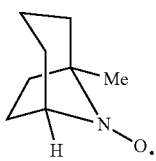
B-2

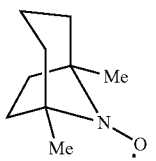
B-3

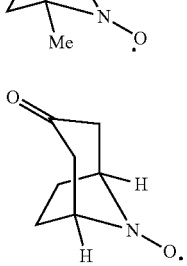
B-4

B-5

B-6

B-7

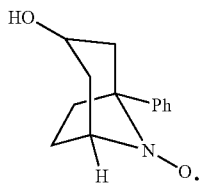
B-8

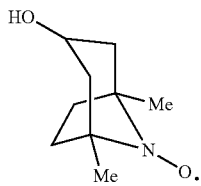
B-9

B-10

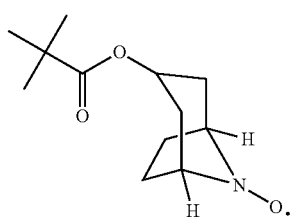
B-11

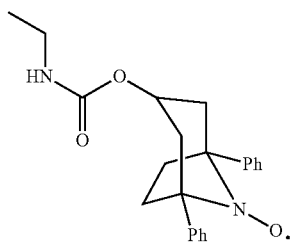
B-12

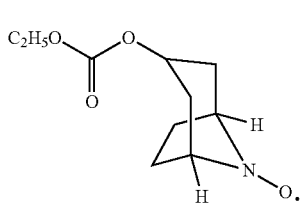
B-13

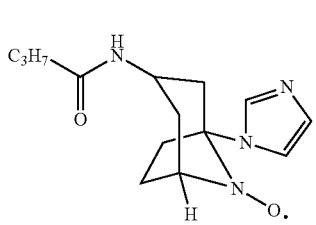
B-14

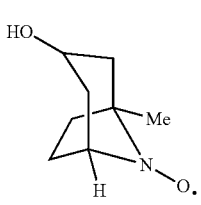

B-15 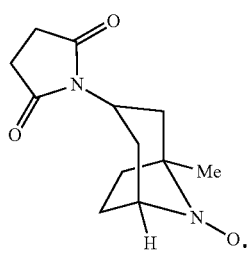
B-16 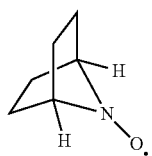
B-17 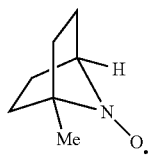
B-18 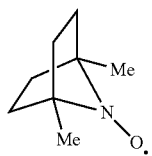
B-19 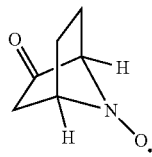
B-20 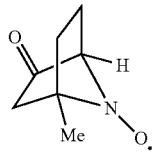
B-21 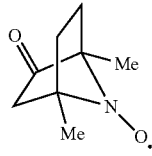
B-22 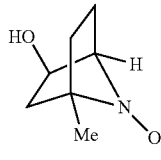
B-23 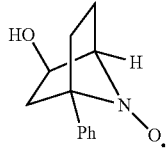
B-24 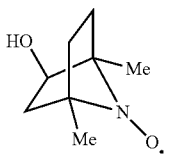
B-25 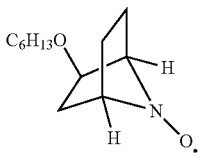
B-26 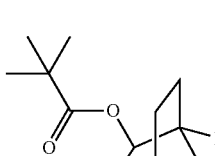
B-27 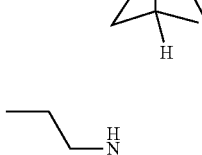
B-28 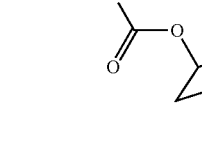
B-29 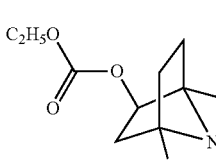
B-30 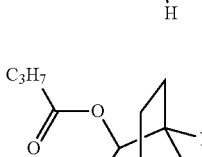
B-31 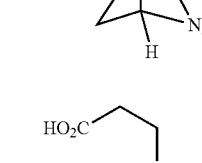

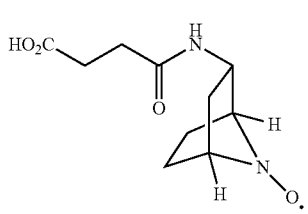

B-32

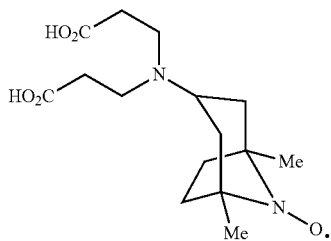

B-33

B-34

B-35

<<Synthesis of N-oxyl Derivative>>

These compounds are possible to be synthesized in accordance with a method described in Tetrahedron letter 49 (2008) 48-52.

<<Electrochromic Compound (Hereinafter, Referred to as EC Compound or EC Dye)>>

The foregoing EC compound is not specifically limited as long as action of coloration or decoloration thereof is produced via at least one of electrochemical oxidation reaction and electrochemical reduction reaction, and it can be appropriately selected in response to the intended purpose. Examples of known EC compounds include an organic metal complex, a conductive polymeric compound and an organic dye in addition to inorganic compounds such as tangusten oxide, iridium oxide, nickel oxide, cobalt oxide, vanadium oxide, molybdenum oxide, titanium oxide, indium oxide, chrome oxide, manganese oxide, Prussian blue, indium nitride, tin nitride, zirconium nitride chloride and so forth.

Examples of the organic metal complex exhibiting an EC property include a metal-bipyridyl complex, a metal phenanthroline complex, a metal-phthalocyanine complex, a rare-earth diphthalocyanine complex, a ferrocene based dye and so forth.

Examples of the conductive polymeric compound exhibiting an EC property include polypyrrole, polythiophene, polyisothianaphthene, polyaniline, polyphenylenediamine, polybenzidine, polyaminophenol, polyvinylcarbazole, polycarbazole, and derivatives thereof.

A polymeric material formed from a bister-pyridine derivative and metal ions as described in Japanese Patent O.P.I. Publication No. 2007-112957 also exhibits an EC property.

Examples of the organic dye exhibiting an EC property include a pyridinium based compound such as viologen or the like, an azine based dye such as phenothiazine or the like, a styryl based dye, an anthraquinone based dye, a pyrazoline based dye, a fluoran based dye, a donor/acceptor type compounds (for example, tetracyanoquinomethane and tetrathiafulvalene) and so forth. Others such as compounds known as a redox indicator or a pH indicator are also usable.

When classifying the EC compound based on change in color tone, it is divided into the following 3 classes.

Class 1: An EC compound changed from a specific color to another color via redox.

Class 2: An EC compound which is substantially achromatic in an oxidization state, and exhibits a certain specific colored state in a reduction state.

Class 3: An EC compound which is substantially achromatic in a reduction state, and exhibits a certain specific colored state in an oxidization state.

As to an electrochemical display element of the present invention, an EC compound can be appropriately selected from the above-described Classes 1-3, depending on an object or use application.

[EC Compound of Class 1]

The EC compound of Class 1 is an EC compound changed from a specific color to another color via redox, and is a compound capable of displaying at least two colors in a possibly generating oxidation state thereof.

As a compound classified into Class 1, for example, $V_2O_5$ appears to be changed from orange to green by changing from an oxidization state to a reduction state, and $Rh_2O_3$ similarly appears to be changed from yellow to dark green.

Many of organic metal complexes are classified into Class 1, and a ruthenium (II) bipyridine complex, for example, a tris (5,5'-dicarboxylethyl-2,2'-bipyridine) ruthenium complex appears to be changed in order from orange to violet, blue, Montpellier green, medium brown, red rust color and red between plus divalence and minus tetravalence. Many of rare-earth diphthalocyanines exhibit such a multicolor property. For example, in the case of rutetium phthalocyanine, change from violet to blue, green and red-orange color in order occurs via oxidization.

Further, many of conductive polymers are classified into Class 1. For example, polythiophene appears to be changed from blue to red by changing from the oxidization state to the reduction state, and polypyrrole appears to be changed from medium brown to yellow. Further, polyaniline or the like exhibits a multicolor property, and appears to be changed from dark blue in the oxidization state to blue, green and light yellow in order.

The EC compound classified into Class 1 has the advantage that multicolor displaying is possible with a single compound, but in contrast, the EC compound is disadvantageous in that a substantially achromatic state can not be produced.

[EC Compound of Class 2]

The EC compound of Class 2 is a compound exhibiting achroma to extremely pypochromatic color in an oxidization state, and exhibiting a certain specific colored state in a reduction state. As inorganic compounds classified into Class 2, the following compounds are cited, and each exhibit color indicated in a parenthesis in the reduction state. $WO_3$ (blue), $MnO_3$ (blue), $Nb_2O_5$ (blue), and $TiO_2$ (blue).

As an organic metal complex classified into Class 2, a tris (bathophenanthroline) iron (II) complex is provided, for example, and exhibits red in the reduction state.

As organic dyes classified into Class 2, provided are compounds disclosed in Japanese Patent O.P.I. Publication No. 62-71934, Japanese Patent O.P.I. Publication No. 2006-

71765 and so forth and so forth, for example, dimethyl terephthalate (red), 4,4'-biphenyl diethyl carboxylate (yellow), 1,4-diacetyl benzene (cyan), or tetrazolium salt compounds disclosed in Japanese Patent O.P.I. Publication No. 1-230026, Published Japanese translation of PCT international Publication No. 2000-504764 and so forth.

As dyes classified into Class 2, most typical examples are pyridium based compounds such as viologen and so forth. Since viologen based compounds are advantageous in that displaying is clear, and color variation via replacement of a substituent is possible to be possessed, most intensive studies of this have been made among organic dyes. Color formation is based on organic radicals generated in the reduction.

As the pyridinium based compound such as viologen or the like, provided are compounds disclosed in the following patents in addition to Published Japanese Translation of PCT International Publication No. 2000-506629.

Japanese Patent O.P.I. Publication No. 5-70455, Japanese Patent O.P.I. Publication No. Japanese 5-170738, Patent O.P.I. Publication No. 2000-235198, Japanese Patent O.P.I. Publication No. 2001-114769, Japanese Patent O.P.I. Publication No. 2001-172293, Japanese Patent O.P.I. Publication No. 2001-181292, Japanese Patent O.P.I. Publication No. 2001-181293, Published Japanese Translation of PCT International Publication No. 2001-510590, Japanese Patent O.P.I. Publication No. 2004-101729, Japanese Patent O.P.I. Publication No. 2006-154683, Published Japanese Translation of PCT International Publication No. 2006-519222, Japanese Patent O.P.I. Publication No. 2007-31708, Japanese Patent O.P.I. Publication No. 2007-171781, Japanese Patent O.P.I. Publication No. 2007-219271, Japanese Patent O.P.I. Publication No. 2007-219272, Japanese Patent O.P.I. Publication No. 2007-279659, Japanese Patent O.P.I. Publication No. 2007-279570, Japanese Patent O.P.I. Publication No. 2007-279571, Japanese Patent O.P.I. Publication No. 2007-279572, and so forth.

Pyridinium compounds such as viologen and so forth, which are usable in the present invention are exemplified below, but the present invention is not limited thereto.

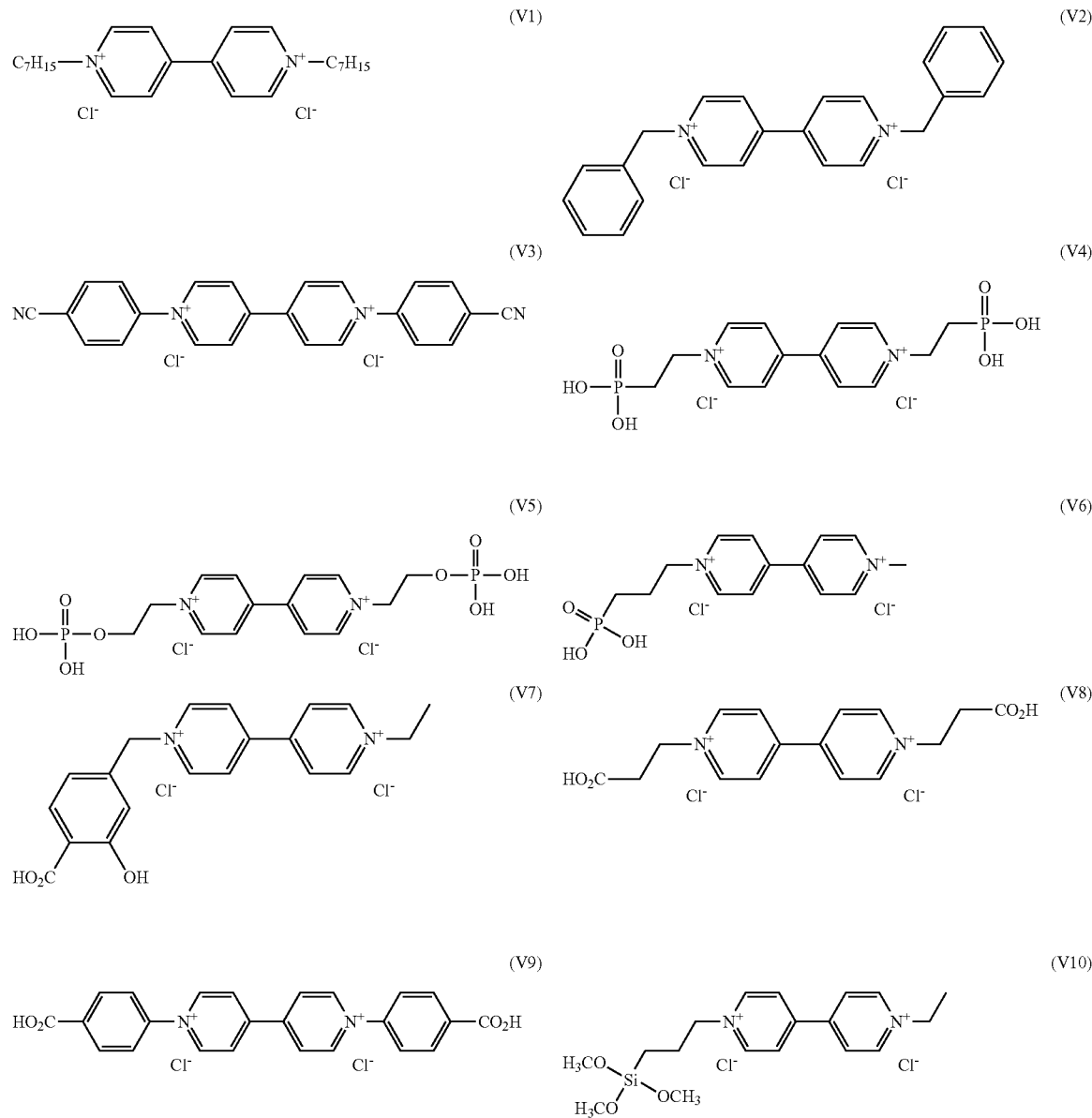

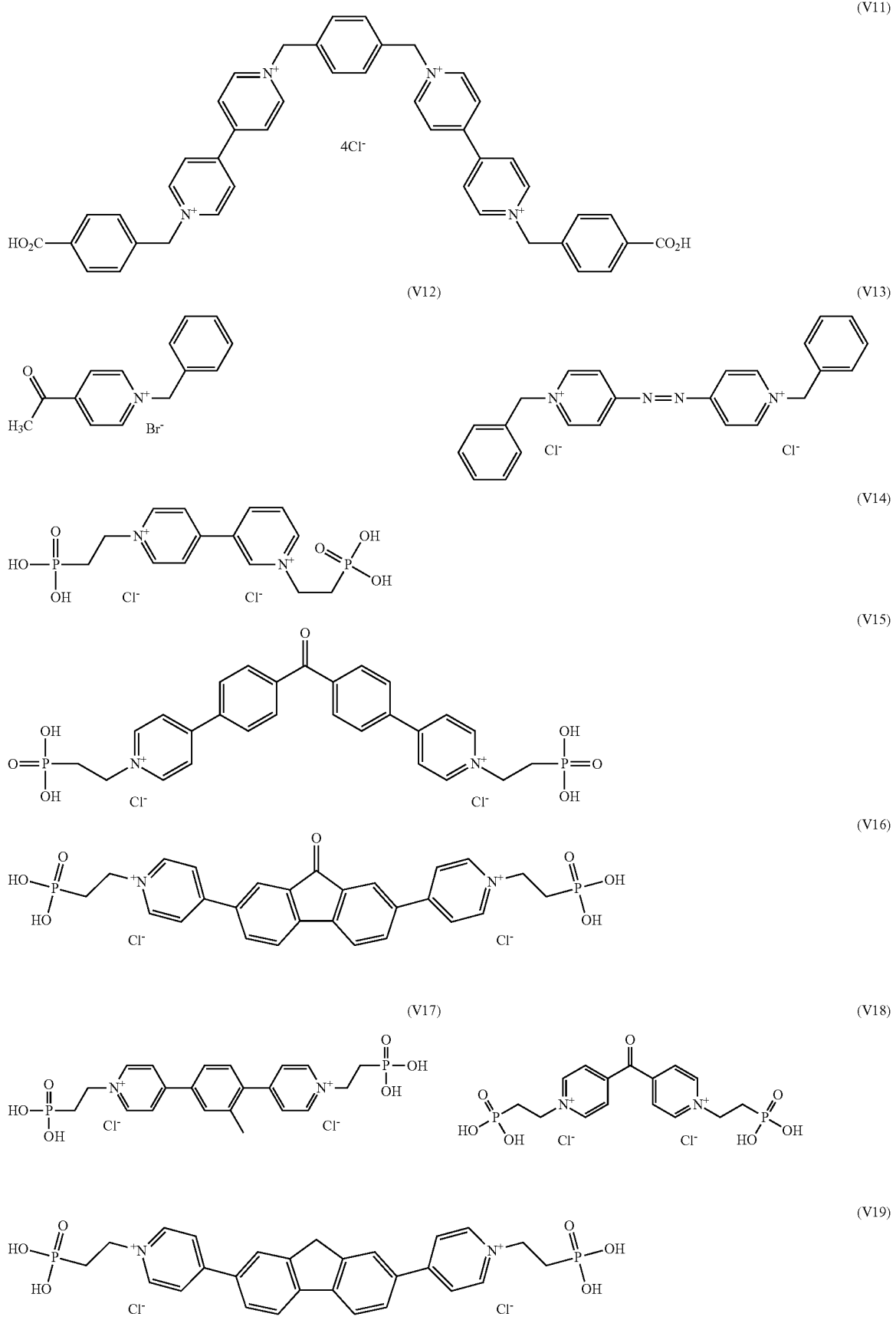

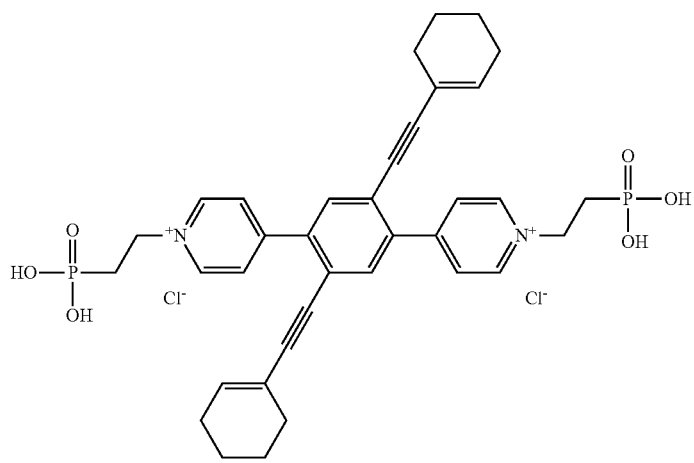

(V20)

[EC Compound of Class 3]

The EC compound of Class 3 is a compound exhibiting achroma to extremely pypochromatic color in a reduction state, and exhibiting a certain specific colored state in an oxididation state.

As inorganic compounds classified into Class 3, for example, iridium oxide (dark blue), Prussian blue (blue) and so forth are provided (each exhibiting color indicated in a parenthesis in the oxidization state).

As the conductive polymer classified into Class 3, not many examples are seen, but for example, a phenyl ether based compound disclosed in Japanese Patent O.P.I. Publication No. 6-263846 is provided.

As dyes classified into Class 3, many dyes are known, but preferable examples thereof include styryl based dyes, azine based dyes such as phenazine, phenothiazine, phenoxazine and acridine, and azole based dyes such as imidazole, oxazole and thiazole.

Styryl based dye, azine based dyes and azole based dyes usable in the present invention are exemplified below, but the present invention is not limited thereto.

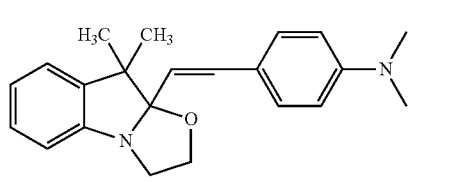

(St1)

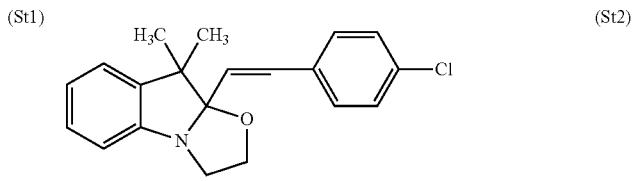

(St2)

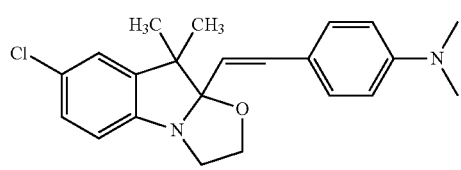

(St3)

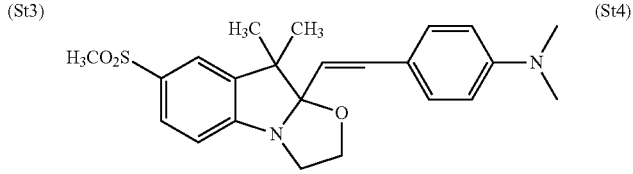

(St4)

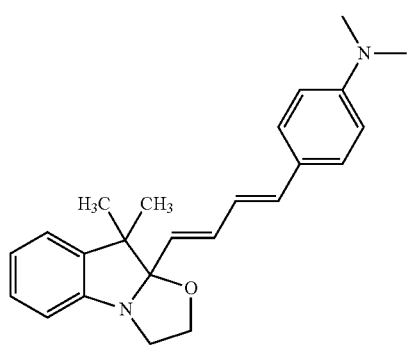

(St5)

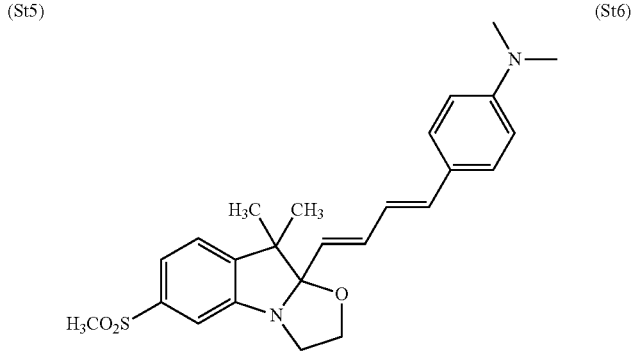

(St6)

-continued
(St7)
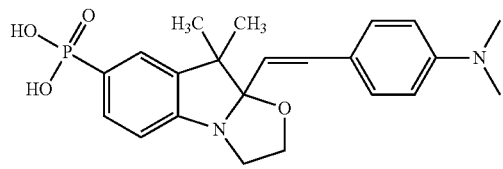
(St8)
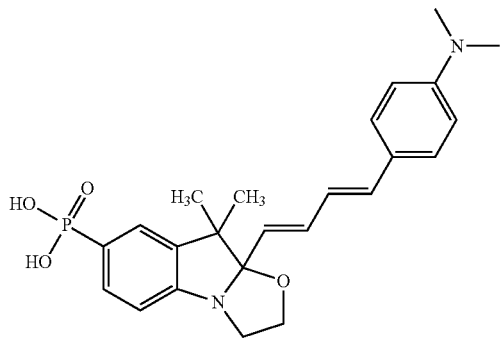
(St9)
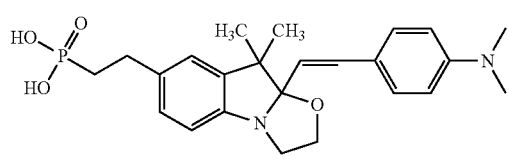
(St10)
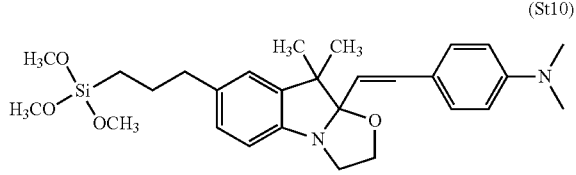
(St11)
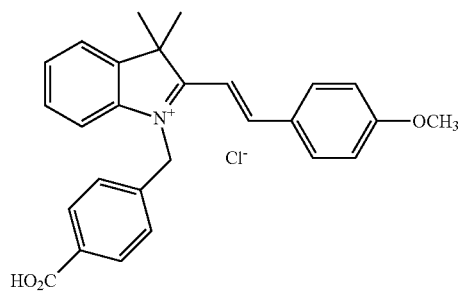
(St12)
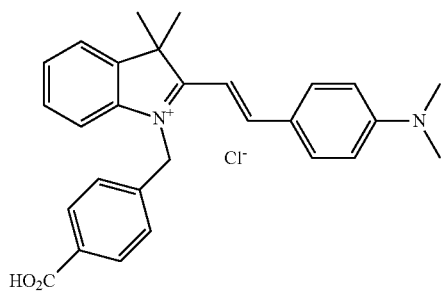
(St13)
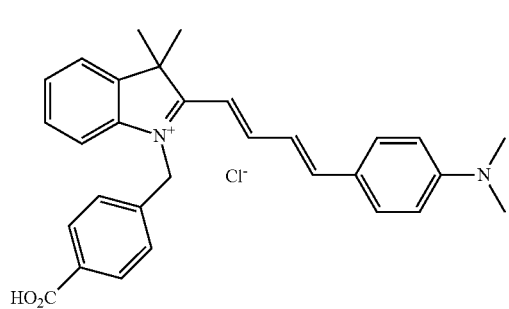
(Ot1)
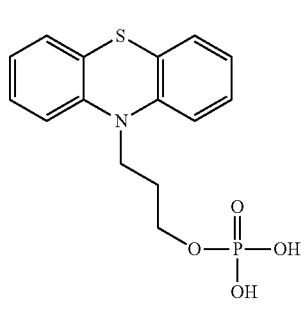
(Ot2)
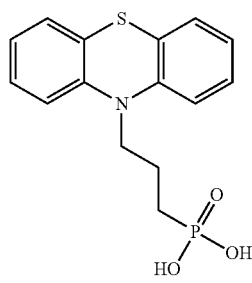
(Ot3)
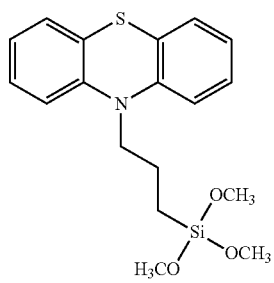

(Ot4)

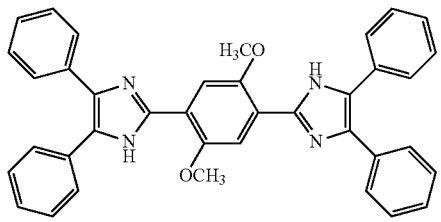

(Ot5)

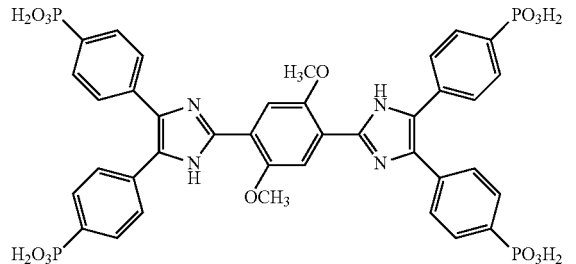

(Ot6)

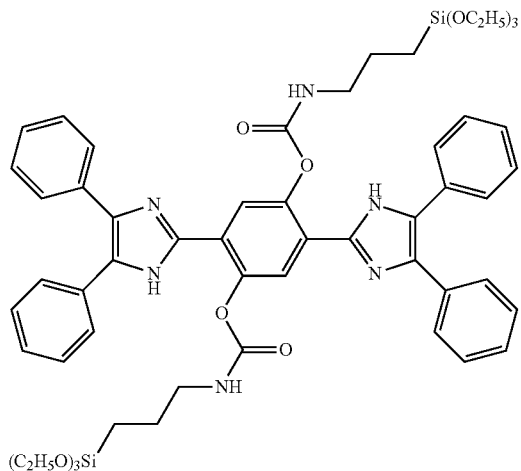

(Ot7)

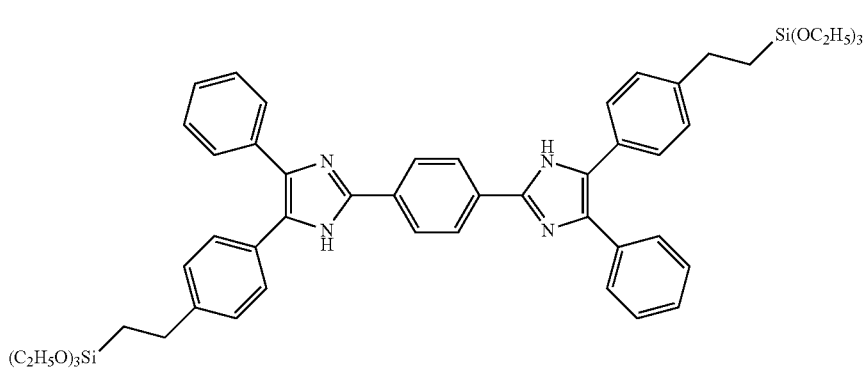

In a preferred embodiment of the present invention, a metal salt reversibly dissolved and deposited via electrochemical redox reaction is used in combination with the foregoing EC dye to conduct displaying of multicolor of at least 3 colors like a black display, a white display and a colored display other than black. In this case, in order to conduct the black display via reduction of the metal salt, the EC compound of Class 3 forming color via oxidization is preferred as an EC dye, and an azole based dye is specifically preferable in view of color formation diversity, low driving voltage and a memory property and so forth. In the present invention, the most preferable dye is a compound represented by the following Formula (L).

Next, the electrochromic compound represented by foregoing Formula (L) in the present invention will be described.

Formula (L)

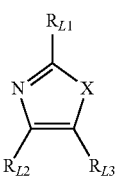

In the foregoing Formula (L), $R_{L1}$ represents a substituted or unsubstituted aryl group; each of $R_{L2}$ and $R_{L3}$ represents a hydrogen atom or a substituent; and X represents —N($R_{L4}$)—, an oxygen atom or a sulfur atom, wherein $R_{L4}$ represents a hydrogen atom or a substituent. When $R_{L1}$ represents an aryl group having a substituent, the substituent is nor specifically limited, and for example, the following substituents are listed.

Provided can be an alkyl group (for example, a methyl group, an ethyl group, a propyl group, an isopropyl group, a t-butyl group, a pentyl group or a hexyl group), a cycloalkyl group (for example, a cyclohexyl group or a cyclopentyl group), an alkenyl group, a cycloalkenyl group, an alkynyl group (for example, a propargyl group), a glycidyl group, an acrylate group, a methacrylate group, an aromatic group (for example, a phenyl group, a naphthyl group or an anthracenyl group), a heterocyclic group (for example, a pyridyl group, a thiazolyl group, an oxazolyl group, an imidazolyl group, a furyl group, a pyrrolyl group, a pyrazinyl group, a pyrimidinyl group, a pyridazinyl group, a selenazolyl group, a sulfolanyl group, a piperidinyl group, a pyrazolyl group or a tetrazolyl group), an alkoxy group (for example, a methoxy group, an ethoxy group, a propyloxy group, a pentyloxy group, a cyclopentyloxy group, a hexyloxy group or a cyclohexyloxy group), an aryloxy group (for example, a phenoxy group), an alkoxylcarbonyl group (for example, a methyloxycarbonyl group, an ethyloxycarbonyl group or a butyloxycarbonyl group), an aryloxycarbonyl group (for example, a phenyloxycarbonyl group), a sulfonamide group (for example, a methane sulfonamide group, an ethane sulfonamide group, a butane sulfonamide group, a hexane sulfonamide group, a cyclohexane sulfonamide group or a benzene sulfonamide group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, a phenylaminosulfonyl group or a 2-pyridylaminosulfonyl group), a urethane group (for example, a methylureide group, an ethylureide group, a pentylureide group, a cyclohexylureide group, a phenylureide group or a 2-pyridylureide group), an acyl group (for example, an acetyl group, a propionyl group, a butanoyl group, a hexanoyl group, a cyclohexanoyl group, a benzoyl group or a pyridinoyl group), a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, a phenylaminocarbonyl group or a 2-pyridylaminocarbonyl group), an acylamino group (for example, an acetylamino group, a benzoylamino group or a methylureide group), an amide group (for example, an acetamide group, a propionamide group, a butanamide, a hexanamide or a benzamide group), a sulfonyl group (for example, a methylsulfonyl group, an ethylsulfonyl group, a butylsulfonyl group, a cyclohexylsulfonyl group a phenylsulfonyl group or a 2-pyridylsulfonyl group), a sulfonamide (for example, a methylsulfonamide group, an octylsulfonamide group, a phenylsulfonamide group or a naphthylsulfonamide group), an amino group (for example, an amino group, an ethylamino group, a dimethylamino group, a butylamino group, a cyclopentylamino group, an anilino group or a 2-pyridylamino group), a halogen atom (for example, a chlorine atom, a bromine atom or an iodine atom), a cyano group, a nitro group, a sulfo group, a carboxyl group, a hydroxyl group or a phosphono group (for example, a phosphonoethyl group, a phosphonopropyl group or a phosphonooxyethyl group). These groups may further be substituted by any of these ones.

As $R_{L1}$, preferable is a substituted or unsubstituted phenyl group, and more preferable is a substituted or unsubstituted 2-hydroxyphenyl group or a substituted or unsubstituted 4-hydroxyphenyl group.

Substituents represented by $R_{L2}$ or $R_{L3}$ are not specifically limited, and those exemplified as substituents each onto an aryl group for the foregoing $R_{L1}$ are provided. $R_{L2}$ and $R_{L3}$ each is preferably an alkyl group, a cycloalkyl group, an aromatic group or a heterocycle group, which may have a substituent. $R_{L2}$ and $R_{L3}$ are connected to each other to form a cyclic structure. As the combination of $R_{L2}$ or $R_{L3}$, there is a case where both of them each are a phenyl group or a heterocyclic group, which may have a substituent, or another case where one of them is a phenyl group or a heterocyclic group, which may have a substituent, and another one is an alkyl group, which may have a substituent.

X is preferably —N($R_{L4}$)—. $R_{L4}$ is preferably a hydrogen atom, an alkyl group, an aromatic group, a heterocycle group or an acyl group, and more preferably a hydrogen atom, an alkyl group having 1 - 10 carbon atoms, an aryl group having 5 - 10 carbon atoms or an acyl group.

In an electrochemical display element of the present invention, a compound represented by Formula (L) in the present invention preferably has a group chemically or physically adsorbed onto the electrode surface. The chemical adsorption of the present invention means a relatively strong adsorption state via chemical bonding to the electrode surface, and the physical adsorption of the present invention means a relatively weak adsorption state via van der Walls force acting between the electrode surface and an adsorbed substance. An adsorption group of the present invention is preferably a chemical adsorption group, and as a chemically adsorbing adsorption group, preferable is —COOH, —P=O(OH)$_2$, —OP=O(OH)$_2$, or —Si(OR)$_3$ (R represents an alkyl group).

Among azole dyes represented by Formula (L), an imidazole based dye represented by the following Formula (L2) is specifically preferable.

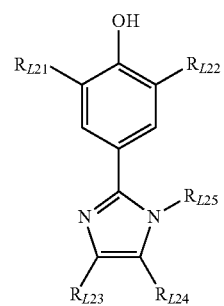

Formula (L2)

In Formula (L2), each of $R_{L21}$ or $R_{L22}$, represents an aliphatic group, an aliphatic oxy group, an acylamino group, a carbamoyl group, an acyl group, a sulfoamide group or sulfamoyl group; $R_{L23}$ represents an aromatic group or an aromatic heterocyclic group; $R_{L24}$ represents a hydrogen atom, an aliphatic group, an aromatic group or an aromatic heterocycle group; and $R_{L25}$ represents a hydrogen atom, an aliphatic group, an aromatic group or an acyl group.

Groups represented by these $R_{L21}$-$R_{L25}$ may be further substituted by arbitrary substituents. However, at least one of groups represented by $R_{L21}$-$R_{L25}$ has —COOH, —P=O(OH)$_2$ or —Si(OR)$_3$ where R is represented by an alkyl group, as a partial structure thereof.

As groups represented by Formulae $R_{L21}$ and $R_{L22}$, an alkyl group (specifically, branched alkyl group), a cycloalkyl group, an alkyloxy group or a cycloalkyloxy group is preferable.

$R_{L23}$ is preferably a substituted or unsubstituted phenyl group, or a 5 or 6-membered heterocyclic group (for example, a thienyl group, a furyl group, a pyrrolyl group, a pyridyl group and so forth). $R_{L24}$ is preferably a substituted or unsubstituted phenyl group, a 5 or 6-membered heterocyclic group or an alkyl group. $R_{L25}$ is preferably a hydrogen atom or an aryl group.

Further, when Formula (L2) is immobilized on an electrode, at least one of groups represented by $R_{L21}$-$R_{L25}$ preferably has —P=O(OH)$_2$ or —Si(OR)$_3$ where R is represented by an alkyl group, as a partial structure thereof, and specifically, a group represented by $R_{L23}$ or $R_{L24}$ preferably has —Si(OR)$_3$ where R is represented by an alkyl group, as a partial structure.

Specific compound examples of the EC dye represented by Formula (L2) and Specific examples of the EC dye included in Formula (L) though not falling into Formula (L), but the present invention is not limited only to these exemplified compounds.

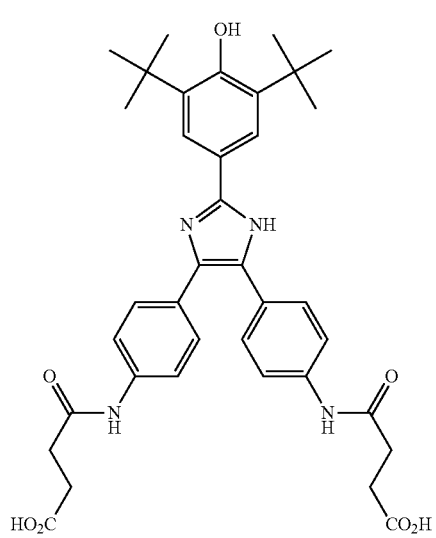
(L1)

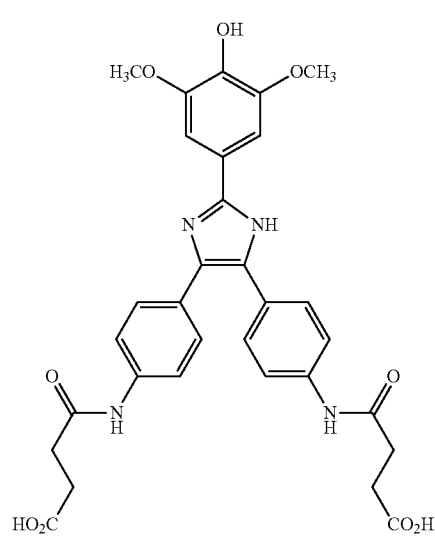
(L2)

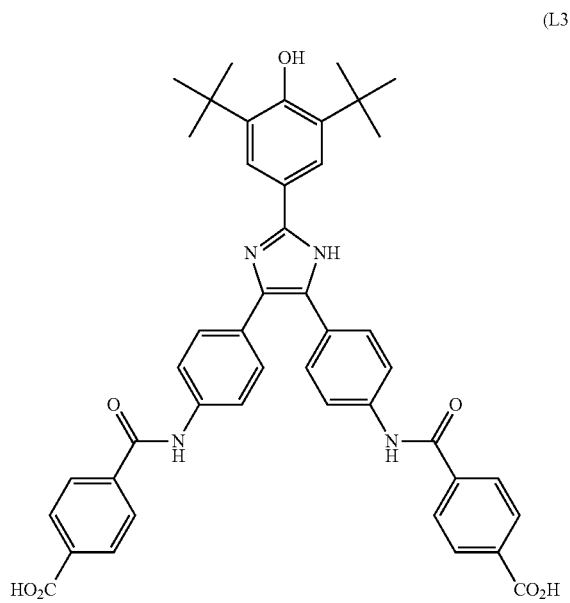
(L3)

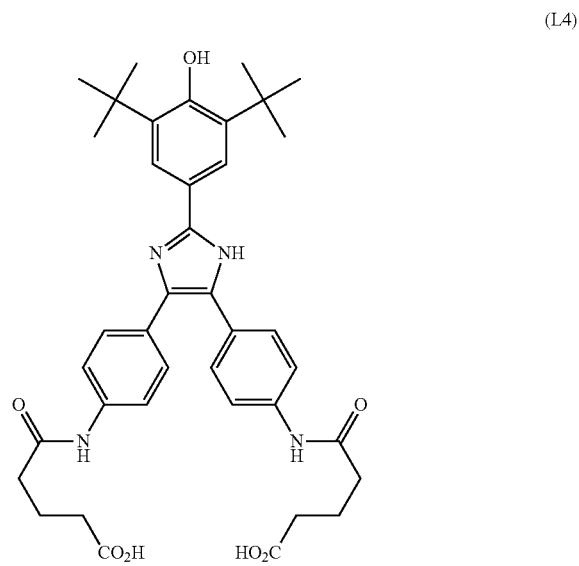
(L4)

-continued
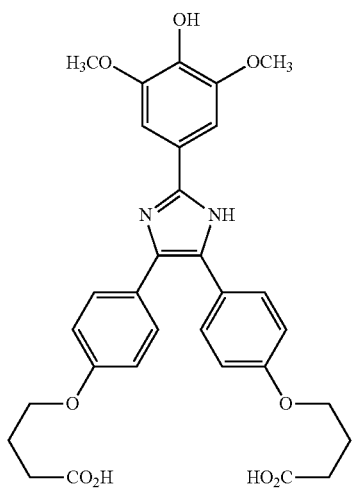
(L5)
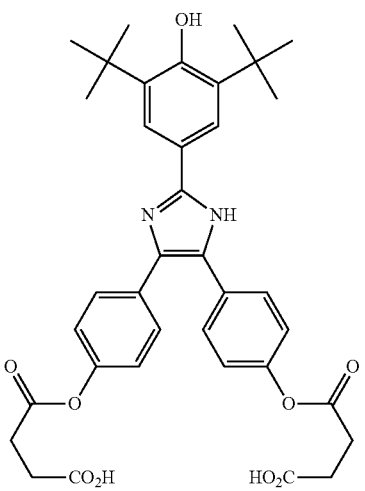
(L6)
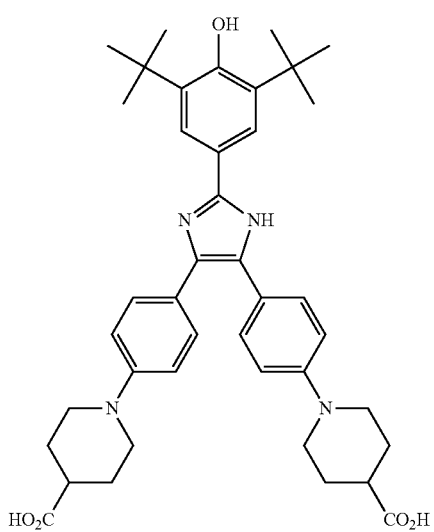
(L7)
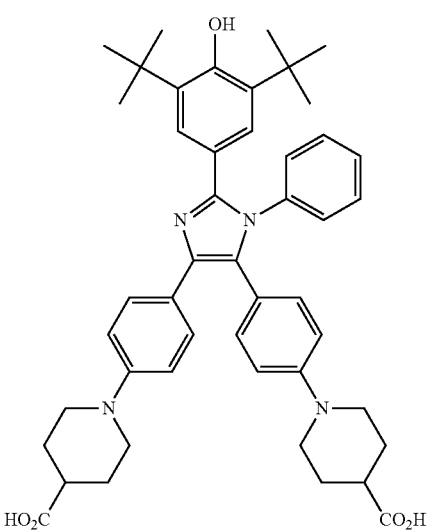
(L8)
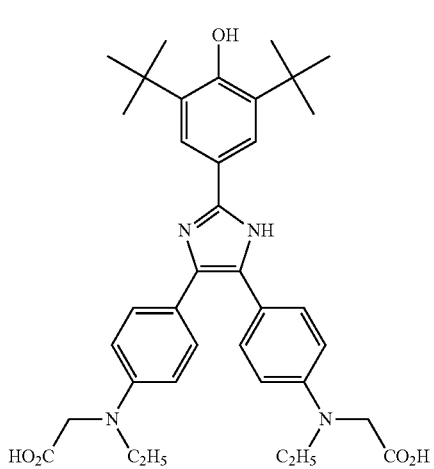
(L9)
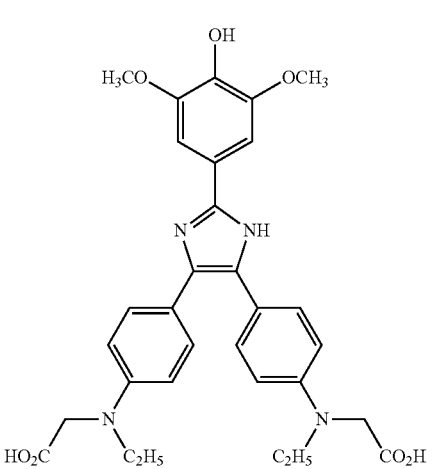
(L10)

(L11) 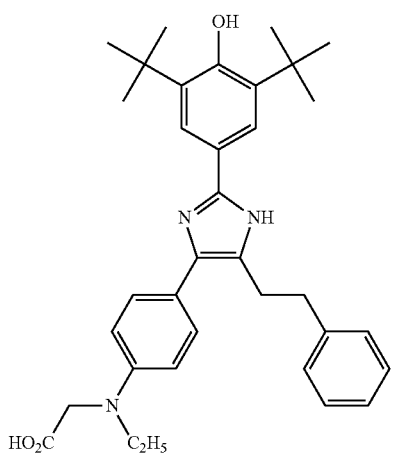
(L12) 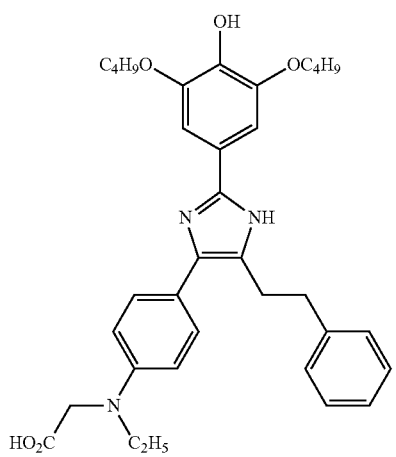
(L13) 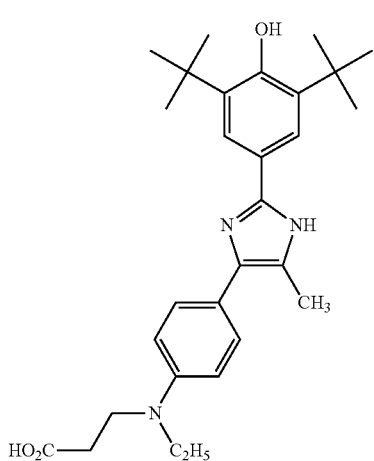
(L14) 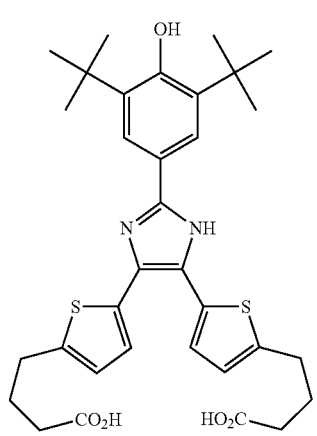
(L15) 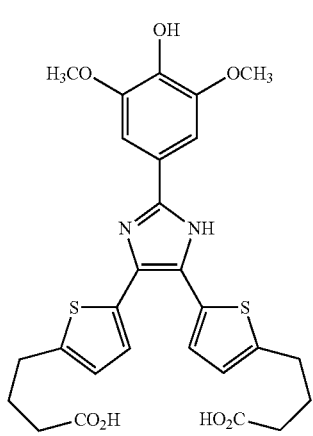
(L16) 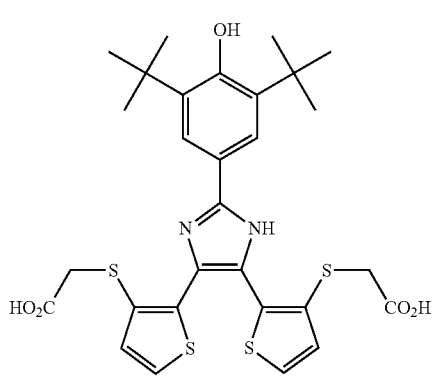

-continued
(L17)
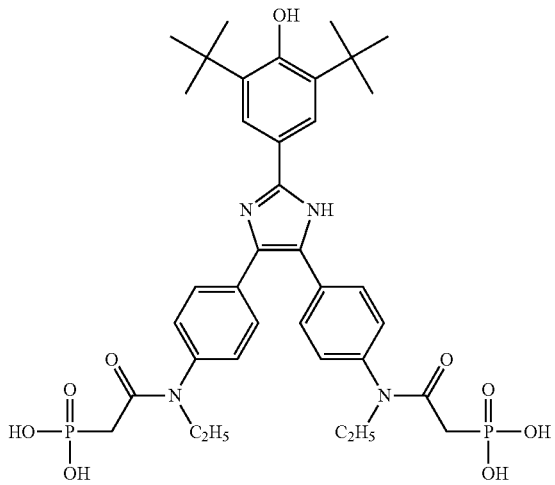
(L18)
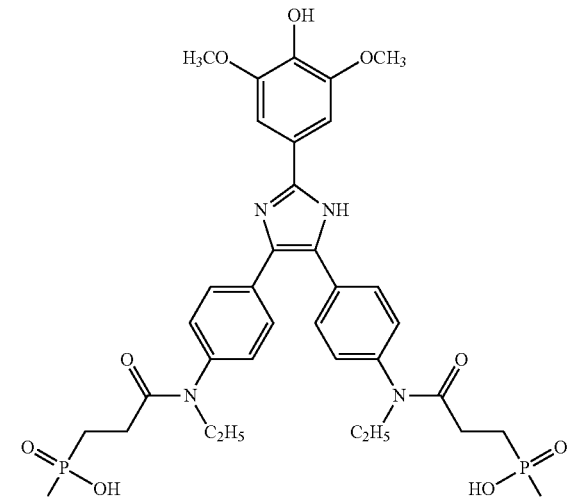
(L19)
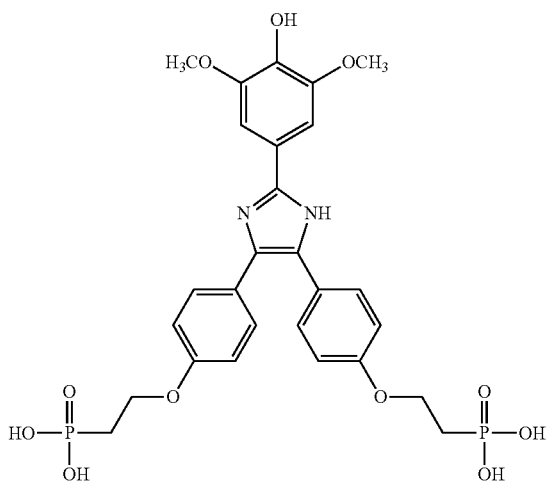
(L20)
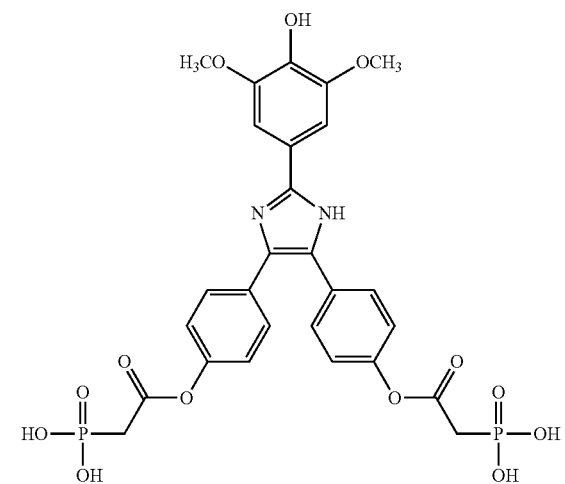
(L21)
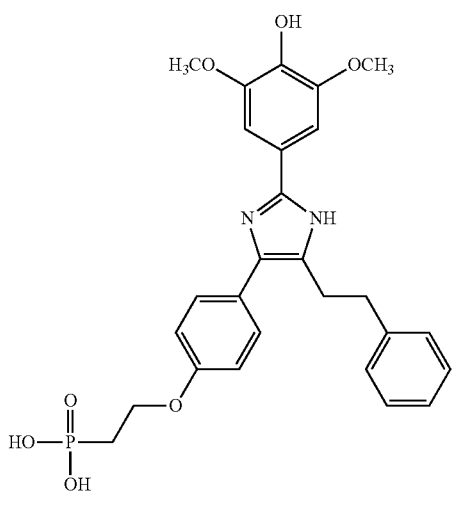
(L22)
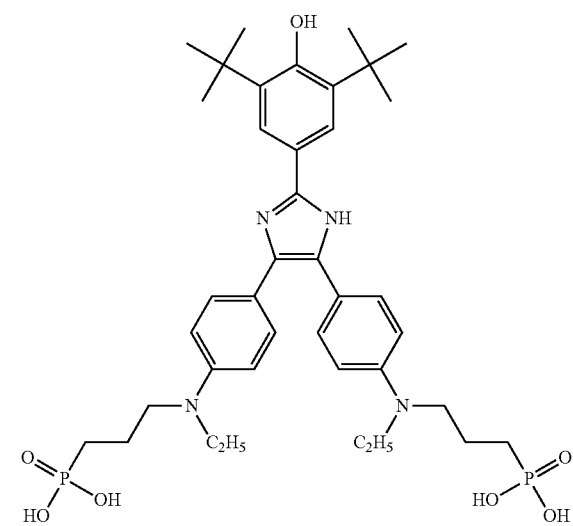

-continued
(L23)
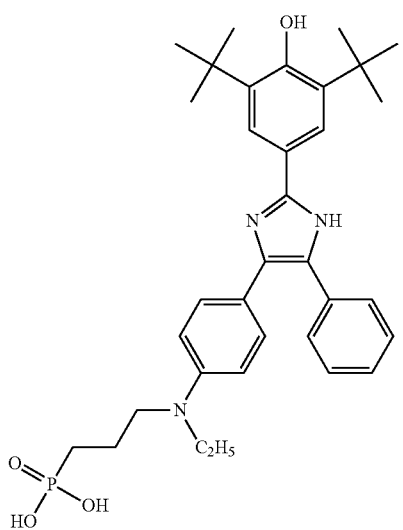
(L24)
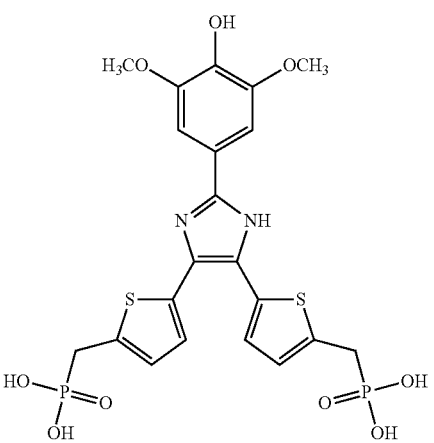
(L25)
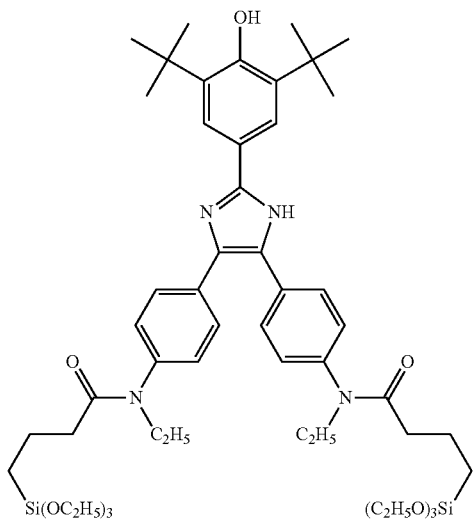
(L26)
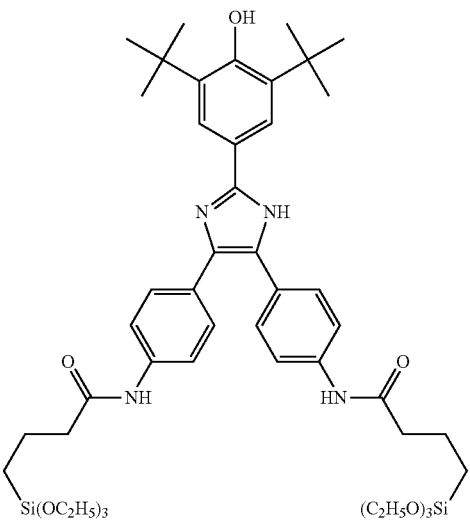
(L27)
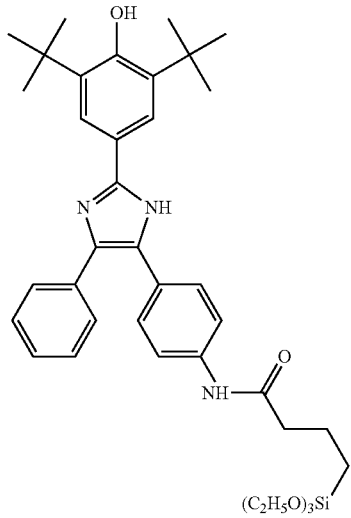
(L28)
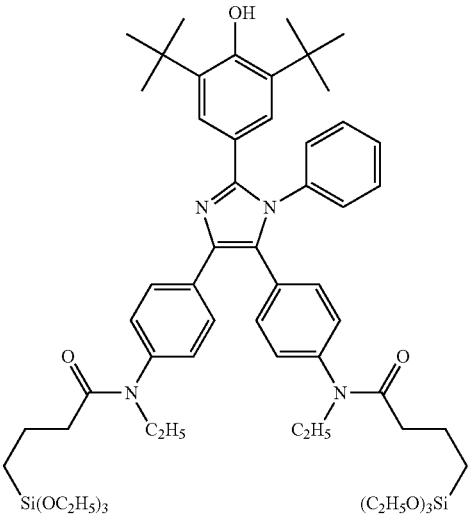

-continued
(L29)
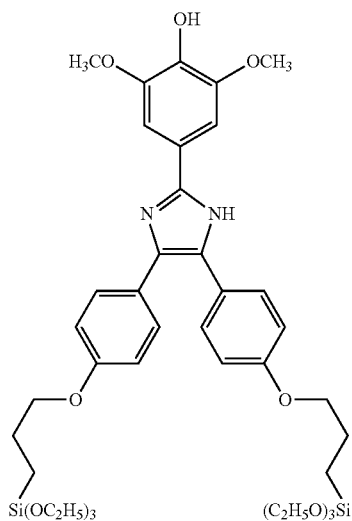
(L30)
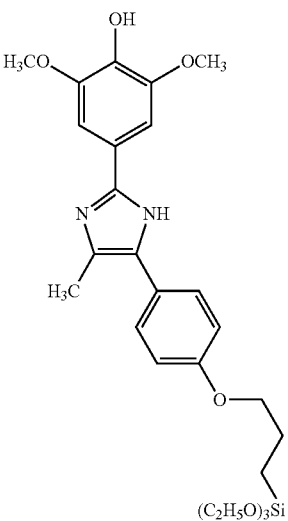
(L31)
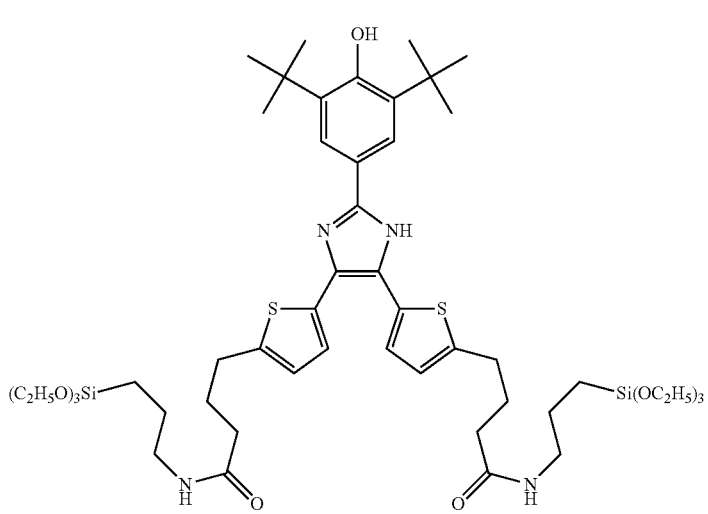
(L32)
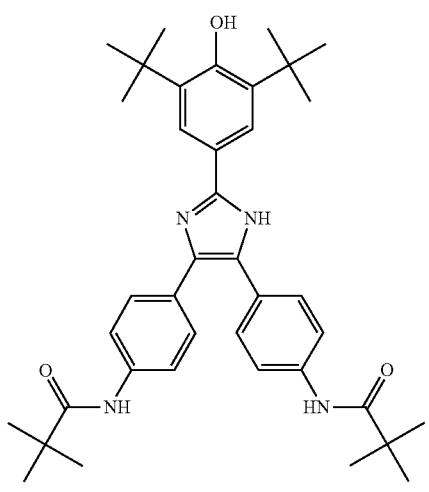
(L33)
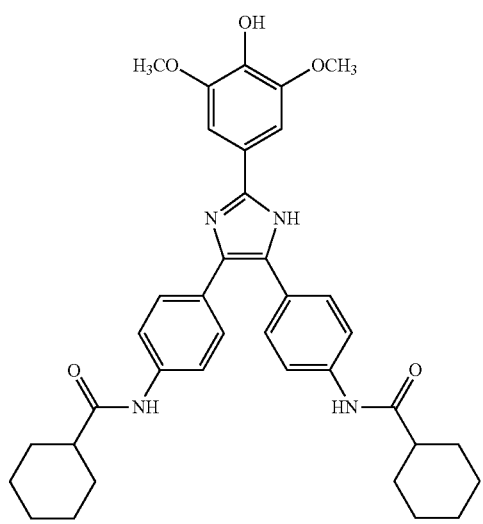

-continued
(L34)
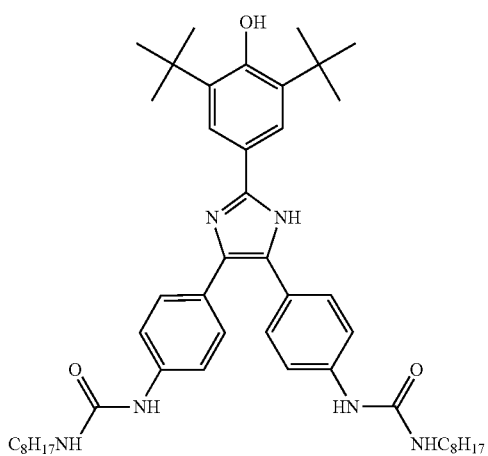
(L35)
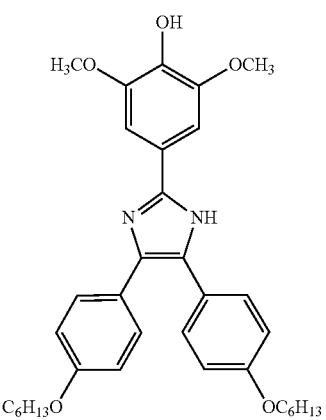
(L36)
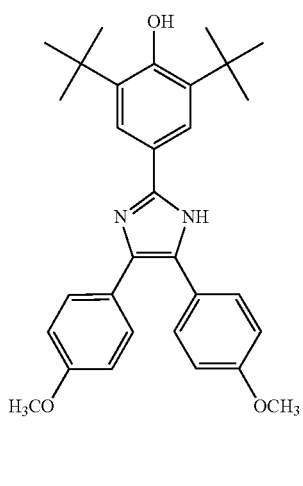
(L37)
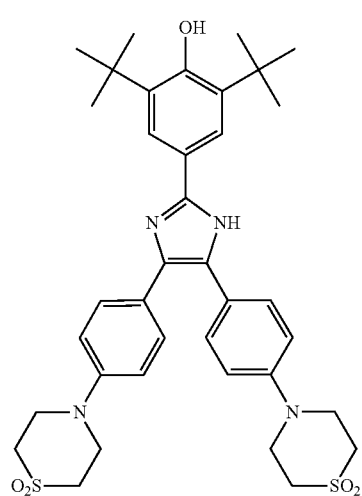
(L38)
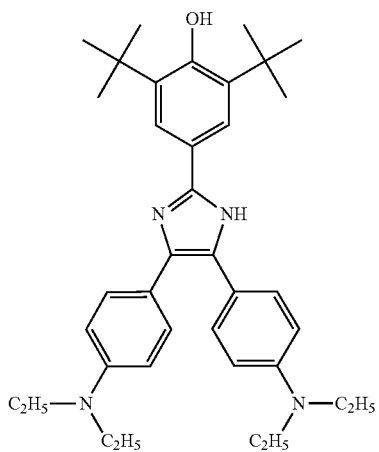
(L39)
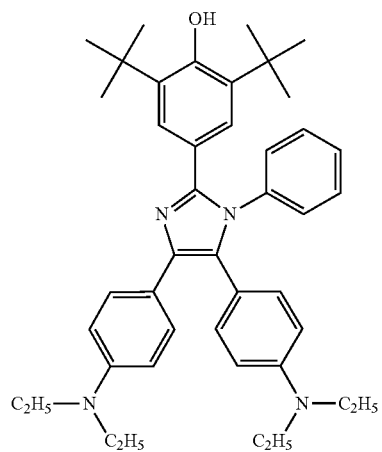

-continued
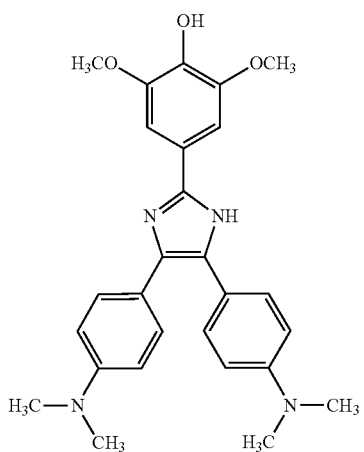
(L40)
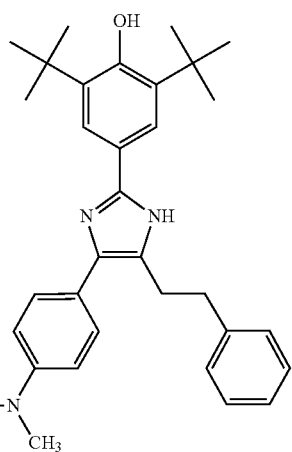
(L41)
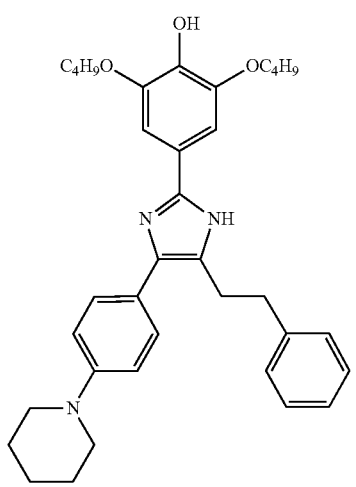
(L42)
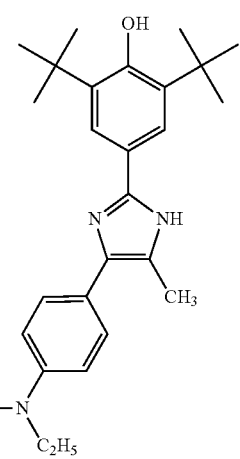
(L43)
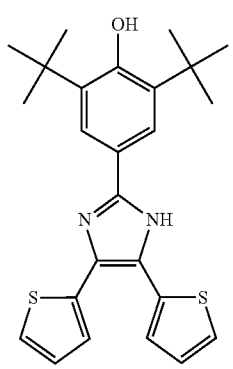
(L44)
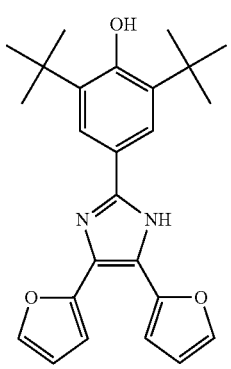
(L45)
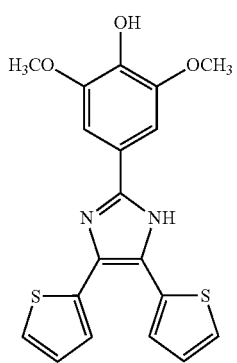
(L46)
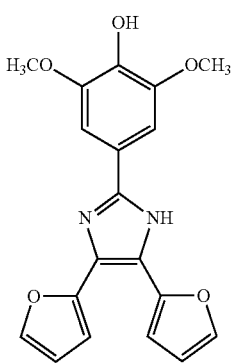
(L47)

-continued
(L48)
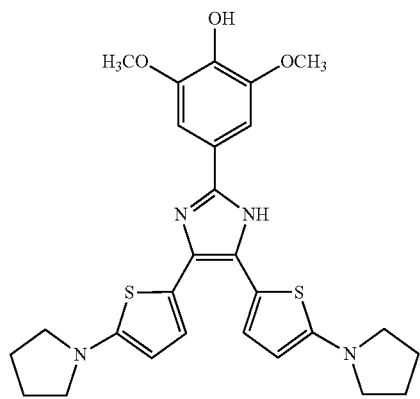
(L49)
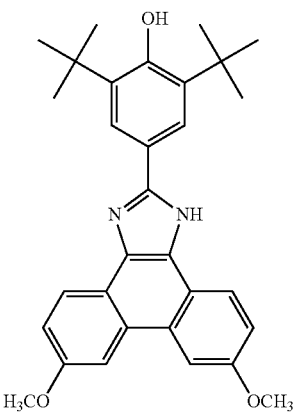
(L50)
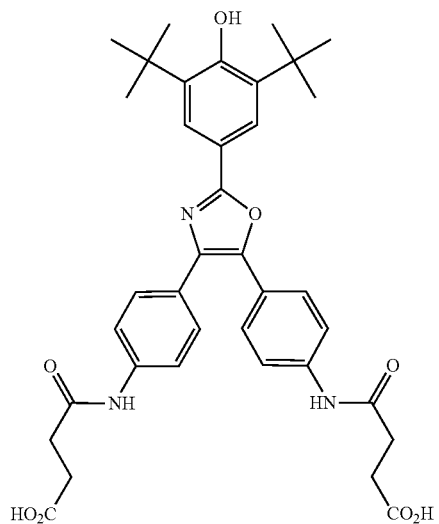
(L51)
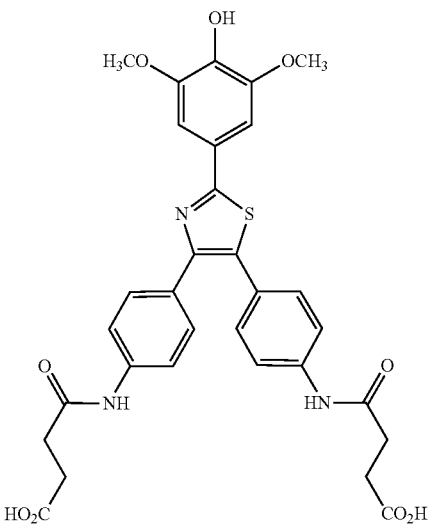
(L52)
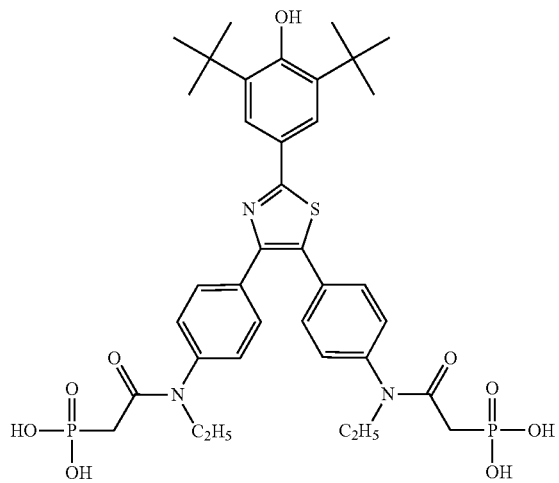
(L53)
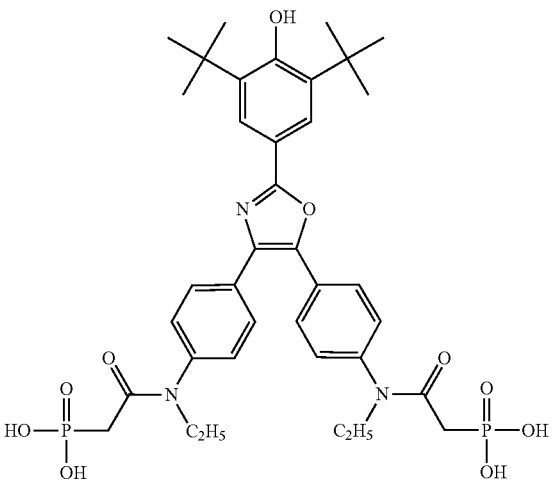

-continued
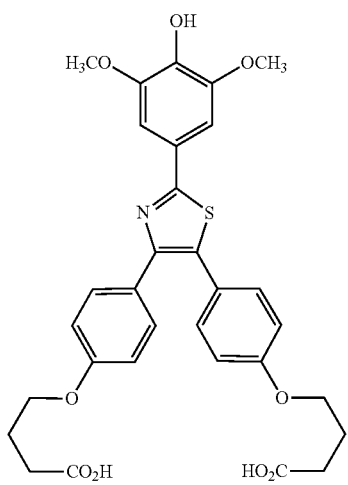
(L54)
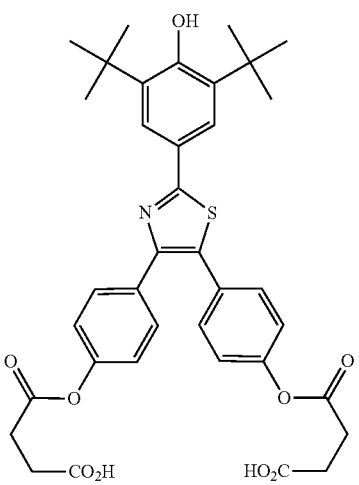
(L55)
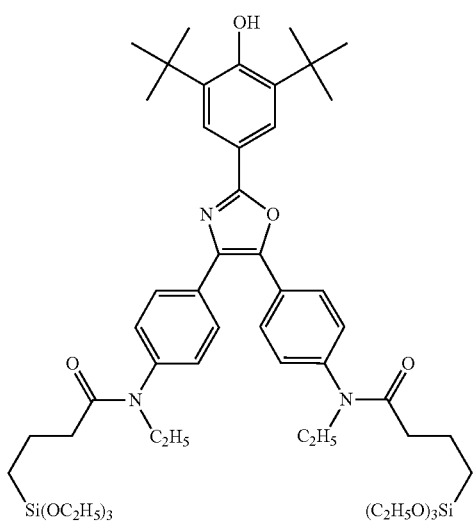
(L56)
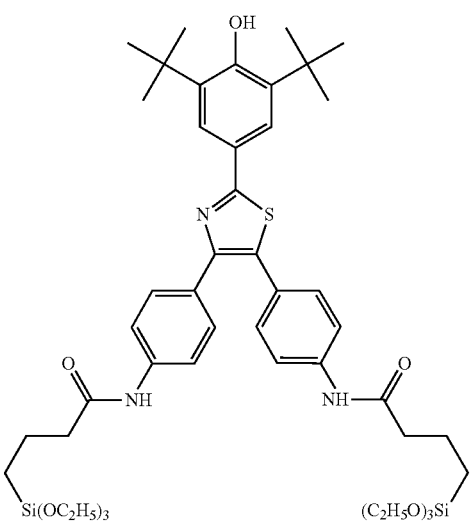
(L57)
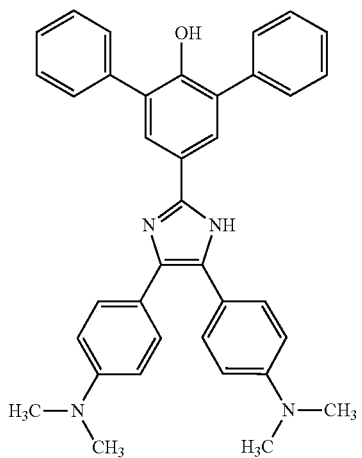
(L58)
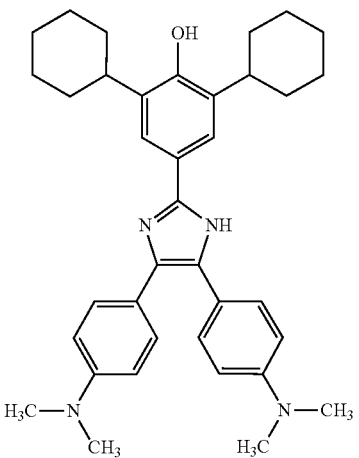
(L59)

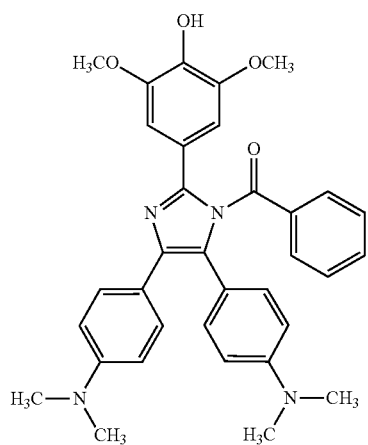 (L60)
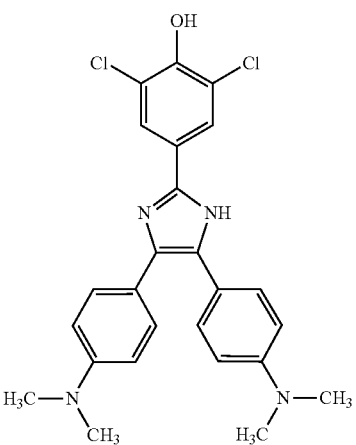 (L61)
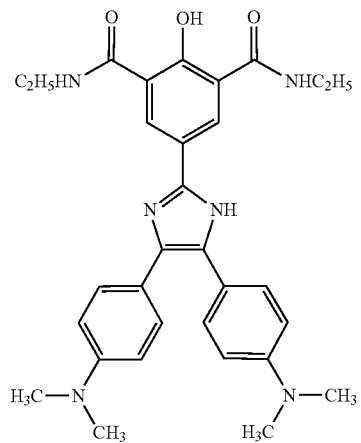 (L62)
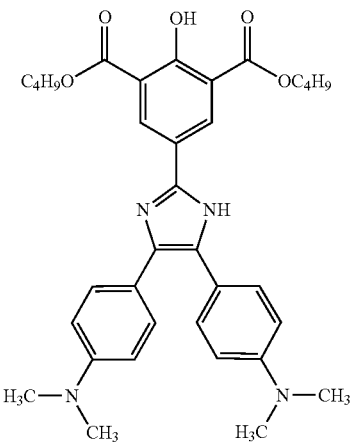 (L63)
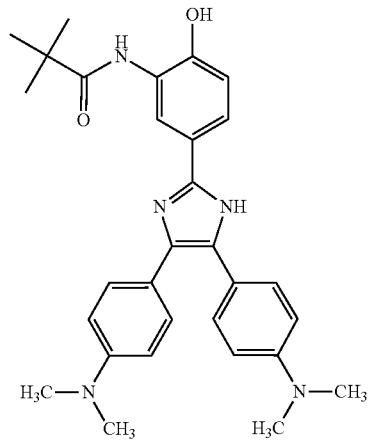 (L64)
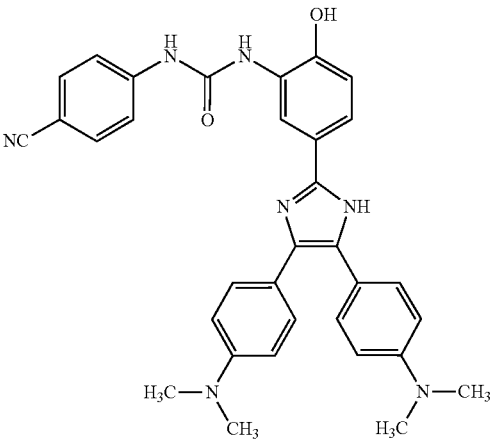 (L65)

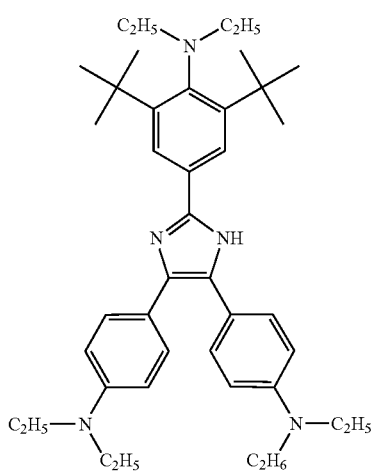
(L66)

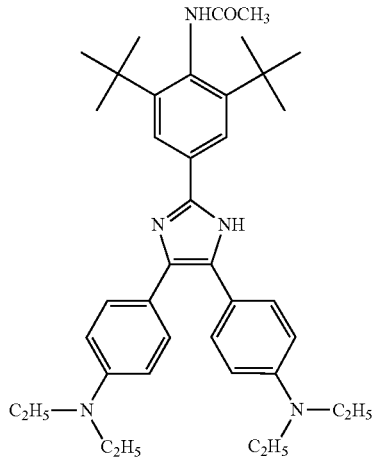
(L67)

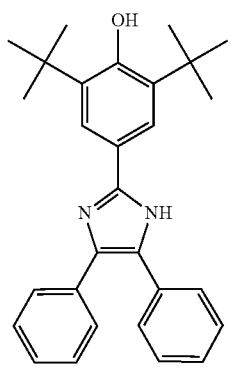
(L68)

<<Electrolyte>>

An ectrolyte described in the present invention is called a substance which is dissolved in a solvent such as water to produce a solution exhibiting ion conductivity (hereinafter referred to as "narrowly-defined electrolyte"), but in the description of the present invention, a mixture prepared by containing another metal or compound regardless of an electrolyte or a non-electrolyte in a narrowly-defined electrode is referred to as an electrolyte ("broadly-defined electrode").

[Electrolyte Solvent]

In the present invention, as the electrolyte solvent, an aprotic polar solvent is used. Usable examples of the aprotic polar solvent include dimethyl carbonate, diethyl carbonate, propylene carbonate, ethylene carbonate, butylolactone, diethyl ether, 1,2-dimethoxyethane, diethylene glycol dimethyl ether, tetrahydrofuran, 2-methyltetrahydrofuran, dioxane, dioxolane, methyldioxolane, acetonitrile, benzonitrile, nitrobenzene, N,N-dimethylformamide, N,N-diethylformamide, sulfoxide, dimethyl sulfoxide dimethyl sulfone, tetramethylene sulfone, N-methyl-2-o-xoindoline, and an admixture thereof.

Boiling points of electrolyte Solvents are not specifically limited, but a high boiling point is preferable in view of inhibition of volatility and productivity, and the electrolyte Solvent preferably has a boiling point of 200° C. or more.

Solvents more preferably used in the present invention are compounds represented by the following Formula (S1) and Formula (S2).

[Compounds Represented by the Following Formula (S1) and Formula (S2)]

As to an electrochemical display element of the present invention, the electrolyte preferably contains a compound represented by Formula (S1) or Formula (S2).

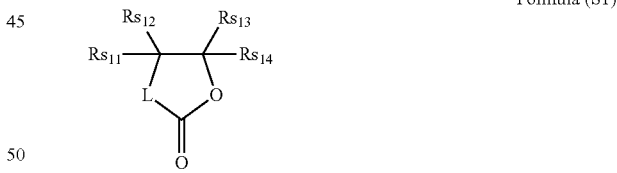

Formula (S1)

wherein L represents an oxygen atom or an alkylene group, and $Rs_{11}$-$Rs_{14}$ each represent a hydrogen atom, an alkyl group, an alkenyl group, an aryl group, a cycloalkyl group, an alkoxyalkyl group or an alkoxy group.

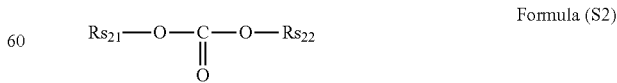

Formula (S2)

wherein $Rs_{21}$ and $Rs_{22}$ each represent an alkyl group, an alkenyl group, an aryl group, a cycloalkyl group, an alkoxyalkyl group or an alkoxy group. First, the compound represented by Formula (S1) will now be detailed.

In the foregoing Formula (S1), L represents an oxygen atom or an alkylene group, and $Rs_{11}$-$Rs_{14}$ each represent a hydrogen atom, an alkyl group, an alkenyl group, an aryl group, a cycloalkyl group, an alkoxyalkyl group or an alkoxy group. These substituents may further be substituted with any appropriate substituent.

Examples of the alkyl group include a methyl group, an ethyl group, a propyl group, an isopropyl group, a t-butyl group, a pentyl group, a hexyl group, a dodecyl group, a tridecyl group, a tetradecyl group and a pentadecyl group; examples of an aryl group include a phenyl group and a naphthyl group; examples of a cycloalkyl group include a cyclopentyl group and a cyclohexyl group; examples of a alkoxyalkyl group include a β-methoxyethyl group and a γ-methoxypropyl group; and examples of an alkoxy group include a methoxy group, an ethoxy group, a propyloxy group, a pentyloxy group, an octyloxy group and a dodecyloxy group.

Specific examples of compounds represented by Formula (S1) are shown below, but the present invention is not limited to these exemplified compounds.

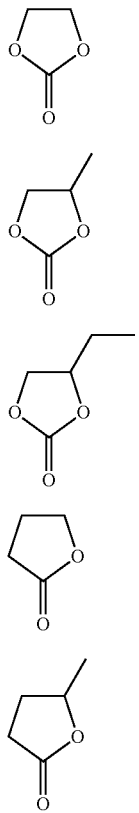

Next, the compound represented by Formula (S2) will be described in detail.

In the foregoing Formula (S2), $Rs_{21}$ and $Rs_{22}$ each represent an alkyl group, an alkenyl group, an aryl group, a cycloalkyl group, alkoxyalkyl group or an alkoxy group.

Examples of the alkyl group include a methyl group, an ethyl group, a propyl group, an isopropyl group, a t-butyl group, a pentyl group, a hexyl group, a dodecyl group, a tridecyl group, a tetradecyl group and a pentadecyl group; examples of the aryl group include a phenyl group and a naphthyl group; examples of the cycloalkyl group include a cyclopentyl group and a cyclohexyl group; examples of a alkoxyalkyl group include a β-methoxyethyl group and a γ-methoxypropyl group; and examples of the alkoxy group include a methoxy group, an ethoxy group, a propyloxy group, a pentyloxy group, an octyloxy group and a dodecyloxy group.

Specific examples of compounds represented by Formula (S2) are shown below, but the present invention is not limited to these exemplified compounds.

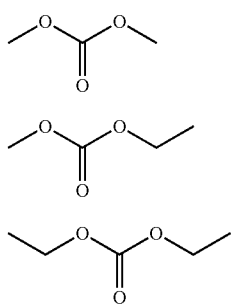

Among compounds represented by Formula (S1) and Formula (S2) as exemplified above, compounds (S1-1), (S1-2) and (S2-3) are specifically preferable.

The compound represented by Formula (S1) or Formula (S2) is one kind of electrolytic solvents, but may be used in combination with another solvent, as long as in an electrochemical display element of the present invention, the objective and effects of the present invention are not deteriorated. Specific examples of such solvents include tetramethylurea, sulfolane, dimethyl sulfoxide, 1,3-dimethyl-2-imidazolidinone, 2-(N-methyl)-2-pyrrolidinone, hexamethylphosphortriamide, N-methylpropioneamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxy ethane, diethoxyfuran, tetrahydrofuran, ethylene glycol, diethylene glycol, triethylene glycol monobutyl ether, and water. Of these solvents described above, it is preferred to contain at least one solvent exhibiting a freezing point of not more than −20° C. and a boiling point of at least 120° C.

Further, other solvents usable in the present invention include compounds shown in, for example, J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electorlytes Handbook", Vol. 1, Academic Press (1972).

[Supporting Electrolyte]

As a supporting electrolyte used in the present invention, a salt, an acid or an alkali conventionally employed in the field of electrochemistry or batteries is usable.

The salt is not specifically limited. Usable examples thereof include an inorganic ion salt such as an alkali metal salt or an alkaline-earth metal salt; a quaternary ammonium salt; a cyclic quaternary ammonium salt; and a quaternary phosphonium salt; and so forth.

Specific examples of salts include metal salts such as a Li salt, a Na salt and a K salt having a counter anion, selected from a halogen ion, $SCN^-$, $ClO_4^-$, $BF_4^-$, $CF_3SO_3^-$, $(CF_3SO_2)_2N^-$, $(C_2F_5SO_2)_2N^-$, $PF_6^-$, $AsF_6^-$, $CH_3COO^-$, $CH_3(C_6H_4)SO_3^-$, and $(C_2F_5SO_2)_3C^-$.

Further, cited is a quaternary ammonium salt having a counter anion, selected from a halogen ion, $SCN^-$, $ClO_4^-$, $BF_4^-$, $CF_3SO_3^-$, $(CF_3SO_2)_2N^-$, $(C_2F_5SO_2)_2N^-$, $PF_6^-$, $AsF_6^-$, $CH_3COO^-$, $CH_3(C_6H_4)SO_3^-$, and $(C_2F_5SO_2)_3C^-$. Specific examples thereof include $(CH_3)_4NBF_4$, $(C_2H_5)_4NF_4$, $(n-C_4H_9)_4NBF_4$, $(C_2H_5)_4NBr$, $(C_2H_5)_4NClO_4$, $(n-C_4H_9)_4NClO_4$, $CH_3(C_2H_5)_3NBF_4$, $(CH_3)_2(C_2H_5)_2NBF_4$, $(CH_3)_4NSO_3CF_3$, $(C_2H_5)_4NSO_3CF_3$, and $(n-C_4H_9)_4NSO_3CF_3$.

Further, other examples are listed below.

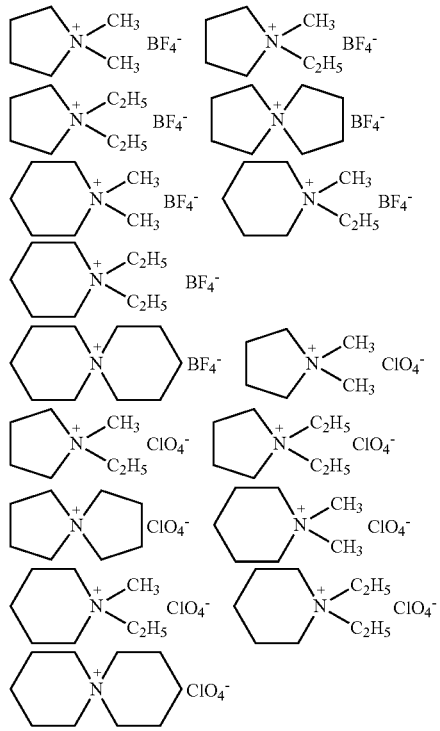

In the present invention, the following compounds other than the above-described electrolyte solvents and supporting electrolytes may be added.

[Metal Salt Compound]

A metal salt compound of the present invention may be any compound, provided that it is a salt containing a kind of metal capable of dissolving and depositing via driving operation of a pair of facing electrodes on at least one of the foregoing electrodes. Examples of preferred kinds of metals include silver, bismuth, copper, nickel, iron, chromium, and zinc. Silver and bismuth are more preferable, and silver is most preferable.

(Silver Salt Compound)

A silver salt compound in the present invention means a generic designation of silver and compounds containing silver in the chemical structure thereof, including, for example, silver oxide, silver sulfide, metal silver, silver colloidal particles, silver halides, silver complex compounds, compounds of silver ion. The phase state species such as a solid state, a solubilization state to liquid, or a gas state and the charging state species such as the neutral, anionic, or cationic state are not specifically taken into account.

The concentration of metal ions contained in an electrolyte of the present invention preferably satisfies the relationship: $0.2$ mol/kg $\leq$ [Metal] $\leq 2.0$ mol/kg. When a metal ion concentration is 0.2 mol/kg or more, a silver solution having sufficient concentration is realized to achieve a desired driving rate. In the case of 2 mol/kg or less, deposition is suppressed, and stability of an electrolytic solution during low temperature storage is enhanced.

(Concentration Ratio of Halogen Ion to Metal Ion)

In an electrochemical display element of the present invention, when the molar concentration of halogen ions or halogen atoms contained in an electrolyte is set to [X] (mol/kg), and the total molar concentration of silver or silver in a compound containing silver in its chemical structure, contained in the foregoing electrolyte is set to [Metal] (mol/kg), the condition specified by the following Expression (1) is preferably satisfied:

$$0 \leq [X]/[Metal] \leq 0.1 \qquad \text{Expression (1)}$$

The halogen atom in the present invention means an iodine atom, a chlorine atom, a bromine atom or a fluorine atom. When [X]/[Metal] is larger than 0.1, the reaction of $X^- \rightarrow X_2$ is induced during redox reaction of a metal and then the $X_2$ is readily subjected to cross-oxidation with the deposited metal, resulting in dissolution of the deposited metal, which produces one factor to decrease memory capability. Therefore, the molar concentration of a halogen atom is preferably as small as possible, compared to that of metal silver. In the present invention, the relationship of $0 \leq [X]/[Metal] \leq 0.001$ is more preferable. When halogen ions are added, with regard to the halogen species, the total molar concentration of each of the halogen species preferably satisfies the relationship: $[I]<[Br]<[Cl]<[F]$ from the viewpoint of memory property enhancement.

(Silver Salt Solvent)

In the present invention, in order to accelerate dissolution and deposition of a metal salt (specifically, a silver salt), a compound represented by the following Formula (G1) or Formula (G2) is preferably contained.

[Compound Represented by Formula (G1) and Compound Represented by Formula (G2)]

In the electrochemical display element of the present invention, an electrolyte preferably contains at least one of compounds represented by the following Formula (G1) and Formula (G2). Compounds represented by Formula (G1) and Formula (G2) are compounds capable of accelerating solubilization of silver in an electrolyte since dissolution and deposition of silver are induced in the present invention. Generally, to allow silver to be dissolved and deposited, silver is desired to be solubilized in an electrolyte. For example, useful is a compound containing chemical structure species exhibiting interaction with silver to produce a coordination bond or a loose covalent bond to silver. As the foregoing chemical structure species, a halogen atom, a mercapto group, a carboxyl group, and an imino group are commonly known, but in the present invention, a compound containing a thioether group and mercaptoazoles effectively act as silver solvents, also exhibiting high solubility to solvents with minimized adverse effects to coexistent compounds.

$$Rg_{11}\text{-}S\text{-}Rg_{12} \qquad \text{Formula (G1)}$$

wherein each of $Rg_{11}$ and $Rg_{12}$ represents a substituted or unsubstituted hydrocarbon group; further, such a hydrocarbon group may contain at least one selected from the group consisting of a nitrogen atom, an oxygen atom, a phosphorous atom, a sulfur atom and a halogen atom; and $Rg_{11}$ and $Rg_{12}$ may be connected to each other to form a cyclic structure.

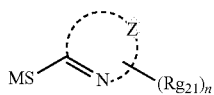

Formula (G2)

wherein M represents a hydrogen atom, a metal atom or a quaternary ammonium; Z represents an atomic group to constitute a nitrogen-containing heterocyclic ring; n is an integer of 0–5; and $Rg_{21}$ represents a substituent, and when n is 2 or more, each $Rg_{21}$ may be the same or different and may be connected to each other to form a condensed ring.

In foregoing Formula (G1), each of $Rg_{11}$ and $Rg_{12}$ represents a substituted or unsubstituted hydrocarbon group; further, such a hydrocarbon group may contain at least one selected from the group consisting of a nitrogen atom, an oxygen atom, a phosphorous atom, a sulfur atom and a halogen atom; and $Rg_{11}$ and $R_{12}$ may be connected to each other to form a cyclic structure.

Groups which are possible to be substituted by a hydrocarbon group thereof include an amino group, a guanidino group, a quaternary ammonium group, a hydroxyl group, a halogen compound, a carboxylic acid group, a carboxylate group, an amide group, a sulfinic acid group, a sulfonic acid group, a sulfate group, a phosphonic acid group, a phosphate group, a nitro group, a cyano group and so forth.

Specific examples of the compound represented by Formula (G1) in the present invention are shown below, but the present invention is not limited to these exemplified compounds.

G1-1: $CH_3SCH_2CH_2OH$
G1-2: $HOCH_2CH_2SCH_2CH_2OH$
G1-3: $HOCH_2CH_2SCH_2CH_2SCH_2CH_2OH$
G1-4: $HOCH_2CH_2SCH_2CH_2SCH_2CH_2SCH_2CH_2OH$
G1-5: $HOCH_2CH_2SCH_2CH_2OCH_2CH_2OCH_2CH_2SCH_2CH_2OH$
G1-6: $HOCH_2CH_2OCH_2CH_2SCH_2CH_2SCH_2CH_2OCH_2CH_2OH$
G1-7: $H_3CSCH_2CH_2COOH$
G1-8: $HOOCCH_2SCH_2COOH$
G1-9: $HOOCCH_2SCH_2CH_2COOH$
G1-10: $HOOCCH_2SCH_2CH_2SCH_2COOH$
G1-11: $HOOCCH_2SCH_2CH_2SCH_2CH_2SCH_2CH_2SCH_2COOH$
G1-12: $HOOCCH_2CH_2SCH_2CH_2SCH_2CH(OH)CH_2SCH_2CH_2SCH_2CH_2COOH$
G1-13: $HOOCCH_2CH_2SCH_2CH_2SCH_2CH(OH)CH(OH)CH_2SCH_2CH_2SCH_2CH_2COOH$
G1-14: $H_3CSCH_2CH_2CH_2NH_2$
G1-15: $H_2NCH_2CH_2SCH_2CH_2NH_2$
G1-16: $H_2NCH_2CH_2SCH_2CH_2SCH_2CH_2NH_2$
G1-17: $H_3CSCH_2CH_2CH(NH_2)COOH$
G1-18: $H_2NCH_2CH_2OCH_2CH_2SCH_2CH_2SCH_2CH_2OCH_2CH_2NH_2$
G1-19: $H_2NCH_2CH_2SCH_2CH_2OCH_2CH_2OCH_2CH_2SCH_2CH_2NH_2$
G1-20: $H_2NCH_2CH_2SCH_2CH_2SCH_2CH_2SCH_2CH_2SCH_2CH_2NH_2$
G1-21: $HOOC(NH_2)CHCH_2CH_2SCH_2CH_2SCH_2CH_2CH(NH_2)COOH$
G1-22: $HOOC(NH_2)CHCH_2SCH_2CH_2OCH_2CH_2OCH_2CH_2SCH_2CH(NH_2)COOH$
G1-23: $HOOC(NH_2)CHCH_2OCH_2CH_2SCH_2CH_2SCH_2CH_2OCH_2CH(NH_2)COOH$
G1-24: $H_2N(=O)CCH_2SCH_2CH_2OCH_2CH_2OCH_2CH_2SCH_2C(=O)NH_2$
G1-25: $H_2N(O=)CCH_2SCH_2CH_2SCH_2C(=O)NH_2$
G1-26: $H_2NHN(O=)CCH_2SCH_2CH_2SCH_2C(=O)NHNH_2$
G1-27: $H_3C(O=)NHCH_2CH_2SCH_2CH_2SCH_2CH_2NHC(O=)CH_3$
G1-28: $H_2NO_2SCH_2CH_2SCH_2CH_2SCH_2CH_2SO_2NH_2$
G1-29: $NaO_3SCH_2CH_2CH_2SCH_2CH_2SCH_2CH_2CH_2SO_3Na$
G1-30: $H_3CSO_2NHCH_2CH_2SCH_2CH_2SCH_2CH_2NHO_2SCH_3$
G1-31: $H_2N(NH)CSCH_2CH_2SC(NH)NH_2 \cdot 2HBr$
G1-32: $H_2(NH)CSCH_2CH_2OCH_2CH_2OCH_2CH_2SC(NH)NH_2 \cdot 2HCl$
G1-33: $H_2N(NH)CNHCH_2CH_2SCH_2CH_2SCH_2CH_2NHC(NH)NH_2 \cdot 2HBr$
G1-34: $[(CH_3)_3NCH_2CH_2SCH_2CH_2SCH_2CH_2N(CH_3)_3]^{2+} \cdot 2Cl^-$

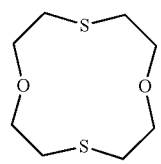

G1-35

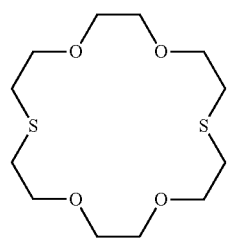

G1-36

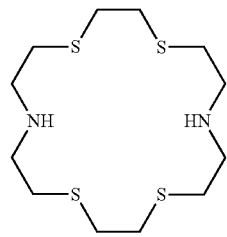

G1-37

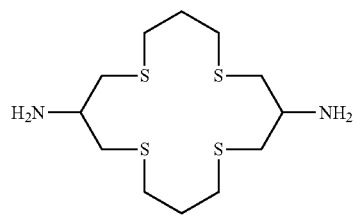

G1-38

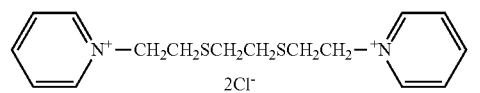

G1-39

G1-40

G1-41
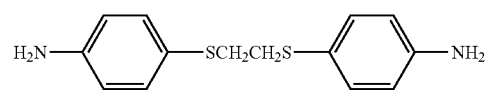

G1-42
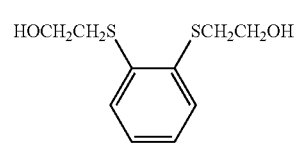

G1-43
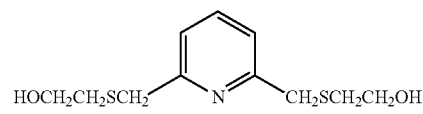

G1-44
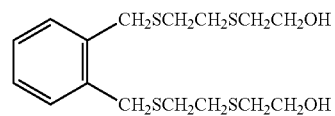

G1-45
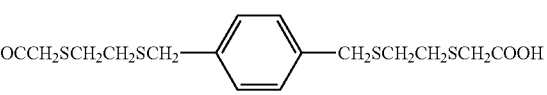

G1-46
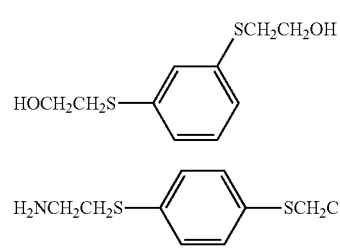

G1-47

Of the above-exemplified compounds, exemplified compound G1-2 is specifically preferable from the viewpoint of sufficiently producing the intended target effect of the present invention.

Next, the compound represented by Formula (G2) in the present invention will be described.

In the forgoing Formula (G2), M represents a hydrogen atom, a metal atom or a quaternary ammonium; Z represents an atomic group to constitute a nitrogen-containing heterocyclic ring; n is an integer of 0-5; and $Rg_{21}$ represents a substituent, and when n is 2 or more, each $Rg_{21}$ may be the same or different and may be connected to each other to form a condensed ring.

Examples of a metal atom represented by M in Formula (G2) include Li, Na, K, Mg, Ca, Zn and Ag. Examples of a quaternary ammonium include $NH_4$, $N(CH_3)_4$, $N(C_4H_9)_4$, $N(CH_3)_3C_{12}H_{25}$ and $N(CH_3)_3CH_2C_6H_5$.

Examples of a nitrogen-containing heterocyclic ring having Z in Formula (G2) as a constituting component include a tetrazole ring a triazole ring, an imidazole ring, an oxazole ring, a thiazole ring, an indole ring, an oxazole ring, a benzoxazole ring, a benzimidazole ring, a benzthiazole ring, a benzoselenazole ring and a naphthoxazole ring.

Substituents represented by $Rg_{21}$ in Formula (G2) are not specifically limited, but the following substituents are listed, for example.

Examples of a halogen atom include a fluorine atom, a chlorine atom, a bromine atom and an iodine atom; examples of an alkyl group include a methyl group, an ethyl group, a propyl group, an i-propyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group and a benzyl group; examples of an aryl group include a phenyl group and a naphthyl group; examples of an alkylcarbonamide group include an acetylamine group, a propionylamino group and a butyloylamino group; examples of an arylcarbonamido group include benzoylamino and so forth; examples of an alkylsulfoneamido group include a methanesulfonylamino group and an ethanesulfonylamino group; examples of an arylsulfoneamido group include a benzenesulfonylamino group and a toluenesulfonylamino group; examples of an aryloxy group include a phenoxy group; examples of an alkylthio group include a methylthio group, an ethylthio group and a butylthio group; examples of an arylthio group include a phenylthio group and a tolylthio group; examples of an alkylcarbamoyl group include a methylcarbamoyl group, a dimethylcarbamoyl group, an ethylcarbamoyl group, a dimethylcarbamoyl group, a dibutylcarbamoyl group, a piperidylcarbamoyl group and a morpholylcarbamoyl group; examples of an anarylcarbamoyl group include a phenylcarbamoyl group, a methylphenylcarbamoyl group, an ethylphenylcarbamoyl group and a benzylphenylcarbamoyl group; examples of an alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group and a morpholylsulfamoyl group; examples of an arylsulfamoyl group include a phenylsulfamoyl group, a methylphenylsulfamoyl group, an ethylphenylsulfamoyl group and a benzylphenylsulfamoyl group; examples of an alkylsulfonyl group include a methanesulfonyl group, and an ethanesulfonyl group; examples of an arylsulfonyl group include a phenylsulfonyl group, a 4-chlorophenylsulfonyl group and a p-toluenesulfonyl group; examples of an alkcoxycarbonyl group include a methoxycarbonyl group, an ethoxycathonyl group, and a butoxycarbonyl group; examples of an aryloxycarbonyl group include a phenoxycarbonyl group and so forth; examples of an alkylcarbonyl group include an acetyl group, a propionyl group and a butyloyl group; examples of an arylcarbonyl group include a benzoyl group and an alkylbenzoyl group; examples of an acyloxy group include an acetyloxy group, a propionyoxy group and a bytyloyloxy group; and examples of a heterocyclic group include groups of an oxazole ring, thiazole ring, triazole ring, selenazole ring, tetrazole ring, oxazole ring, thiadiazole ring, thiazin ring, triazine ring, benzoxazole ring, benzthiazole ring, indolenine ring, benzoselenazole ring, naphthothiazole ring, triazaindolidine ring diazaindolidine ring and tetrazaindolidine. These substituents include those further having a substituent.

Next, preferable examples of the compound represented by Formula (G2) are shown, but the present invention is not limited thereto.

G2-1
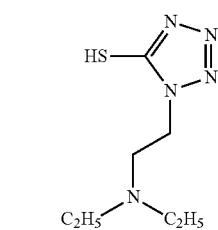

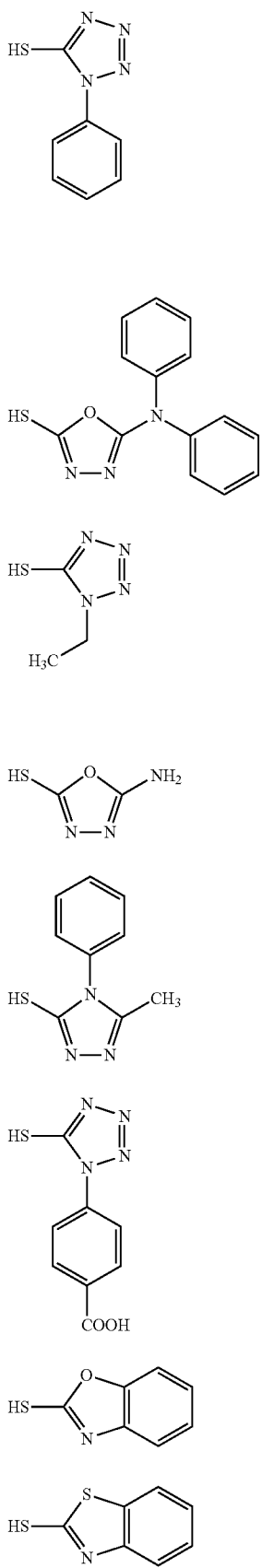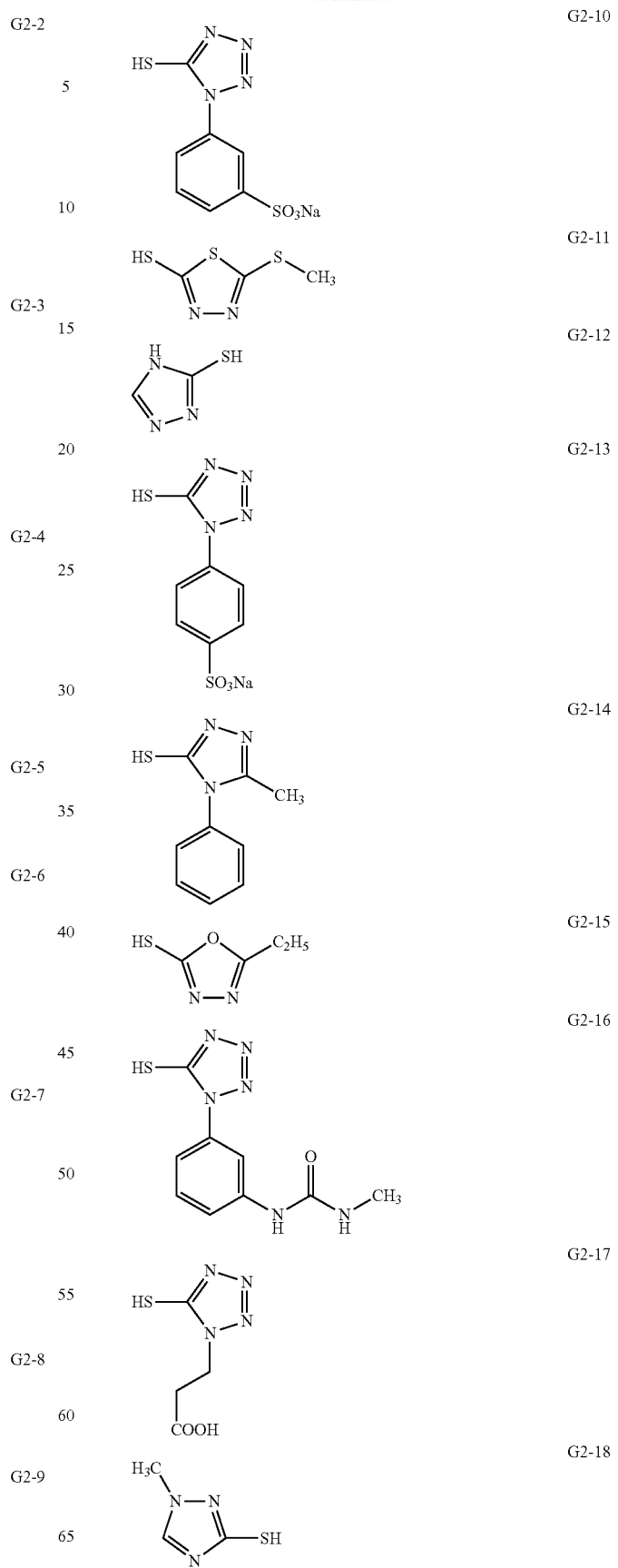

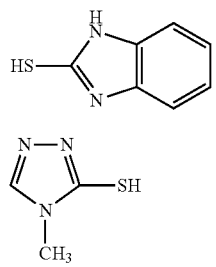

Of the above-exemplified compounds, exemplified compounds G2-12, G2-18 and G2-20 are specifically preferable from the viewpoint of sufficiently producing the intended target effect of the present invention.

<White Scattering Material>

In the present invention, from the viewpoint of increasing display contrast and white display reflectance, a white scattering material is preferably contained, and a porous white scattering layer may be arranged to be formed.

A porous white scattering layer applicable to the present invention can be formed by coating and drying an aqueous mixture of an aqueous polymer substantially insoluble in an electrolyte solvent, and a white pigment.

Examples of the white pigment applicable to the present invention include titanium dioxide (anatase or rutile type), barium sulfate, calcium carbonate, aluminum oxide, zinc oxide, magnesium oxide, zinc hydroxide, magnesium hydroxide, magnesium phosphate, magnesium hydrogen phosphate, alkaline earth metal salts, talc, kaolin, zeolite, acid clay, glass, and organic compounds such as polyethylene, polystyrene, acrylic resins, ionomers, ethylene-vinyl acetate copolymeric resins, benzoguanamine resins, urea-formalin resins, melamine-formalin resins, or polyamide resins. These compounds may be used singly or in combination, and may also be used in a state where voids capable of varying refractive index are contained in particles.

In the present invention, of the above-described white particles, titanium dioxide, zinc oxide, and zinc hydroxide are preferably used. Further, usable are titanium dioxide surface-treated with an inorganic oxide (e.g., $Al_2O_3$, AlO(OH), or $SiO_2$); and titanium dioxide which is further treated, in addition to the above surface treatment, with an organic compound such as trimethylol ethane, triethanolamine acetate, or trimethylcyclosilane.

Of these white particles, titanium oxide or zinc oxide is more preferably used from the viewpoint of coloring inhibition at high temperature and of reflectance of an element originated from the refractive index.

In the present invention, as aqueous polymers substantially insoluble in an electrolyte solvent, water-soluble polymers and polymers dispersed in an aqueous solvent are listed.

Examples of the water-soluble compound include protein such as gelatin or gelatin derivatives; cellulose derivatives; natural compounds such as polysaccharides like starch, gum arabic, dextran, pullulan, carageenan; and synthetic polymeric compounds such as polyvinyl alcohol, polyvinyl pyrrolidone, acrylamide polymers, and their derivatives. The gelatin derivatives include acetylated gelatin and phthalated gelatin. The polyvinyl alcohol derivatives include terminal alkyl-modified polyvinyl alcohol and terminal mercapto group-modified polyvinyl alcohol. The cellulose derivatives include hydroxyethyl cellulose, hydroxypropyl cellulose, and carboxymethyl cellulose. In addition, there are also usable those described in Research Disclosure and on pages 71-75 of Japanese Patent O.P.I. Publication No. 64-13546; and highly water-absorbing polymers described in U.S. Pat. No. 4,960,681 and Japanese Patent O.P.I. Publication No. 62-245260, that is, including homopolymers of vinyl monomers containing —COOM or —$SO_3$ M (M is a hydrogen atom or an alkali metal) and copolymers of these monomers or of the same or other monomers (e.g., sodium methacrylate, ammonium methacrylate, and potassium acrylate). These binders can be also used in combination with at least 2 kinds.

In the present invention, gelatin, a gelatin derivative, polyvinyl alcohol, or a derivative thereof is preferably usable.

Examples of polymers dispersed in an aqueous solvent include latexes such as natural rubber latex, styrene butadiene rubber, butadiene rubber, nitrile rubber, chloroprene rubber and isoprene rubber; and thermosetting resins prepared by dispersing, in an aqueous solvent, polyisocyanate based, epoxy based, acrylic based, silicone based, polyurethane based, urea based, phenol based, formaldehyde based, epoxy-polyamide based, melamine based, alkyd based, or vinyl based resins. Of these polymers, aqueous polyurethane resins described in Japanese Patent O.P.I. Publication No. 10-76621 are preferably used.

The meaning of "being substantially insoluble in an electrolyte solvent" in the present invention is defined as a state where the dissolved amount per kg of an electrolyte solvent is 0-10 g in the temperature range between −20° C. and 120° C. Such a dissolved amount can be determined using any of the methods known in the art such as a mass measurement method or a component quantitative method employing a liquid chromatogram or a gas chromatogram.

In the present invention, an aqueous mixture of an aqueous compound and a white pigment is preferably in a form where the white pigment is dispersed in water using a commonly known dispersion method. The mixture ratio of the aqueous compound/the white pigment is preferably 1-0.01 by volume, and more preferably 0.3-0.05 by volume.

In the present invention, a medium to coat an aqueous mixture of an aqueous compound and a white pigment may be located anywhere if being located on a component between a pair of facing electrodes of an electrochemical display element, but is preferably provided on the surface of at least one of a pair of facing electrodes. Examples of medium providing methods include a coating system; a liquid spray system; a spray system via a gas phase such as a system which ejects liquid droplets employing vibration of a piezoelectric element, e.g., a piezo-system ink-jet head; a BUBBLE JET® ink-jet head which ejects liquid droplets employing a thermal head utilizing bumping; and a spray system which sprays liquid via air or liquid pressure.

As a coating system, appropriately selected can be a commonly known coating system, and examples thereof include an air doctor coater, a blade coater, a rod coater, a knife coater, a squeeze coater, an impregnation coater, a reverse roller coater, a transfer roller coater, a curtain coater, a double roller coater, a slide hopper coater, a gravure coater, a kiss roll coater, a bead coater, a cast coater, a spray coater, a calender coater, and an extrusion coater.

Drying of an aqueous mixture of an aqueous compound and a white pigment provided on a medium may be carried out using any method, provided that water can be evaporated by the method. Examples thereof include heating via a heat source, a heating method using infrared radiation, and a heating method using electromagnetic induction. Further, water evaporation may be carried out under reduced pressure.

The term "being porous" in the present invention means a penetration state being able to induce dissolution and deposition reaction of silver and to allow ion species to migrate between electrodes as described below: a porous white scattering material is formed by coating an aqueous mixture of the aqueous compound and the white pigment on an electrode, followed by drying the aqueous mixture; an electrolyte liquid, containing silver or a compound containing silver in its chemical structure, is applied on the scattering material, and then sandwiched by a pair of facing electrodes; and an electrical potential difference is applied between the facing electrodes.

In an electrochemical display element of the present invention, an aqueous compound is desirably cured with a hardener during coating and drying or after drying of the aqueous mixture described above.

Examples of such a hardener used in the present invention include hardeners described in column 41 of U.S. Pat. Nos. 4,678,739, 4,791,042, Japanese Patent O.P.I. Publication No. 59-116655, Japanese Patent O.P.I. Publication No. 62-245261, Japanese Patent O.P.I. Publication No. 61-18942, Japanese Patent O.P.I. Publication No. 61-249054, Japanese Patent O.P.I. Publication No. 61-245153, and Japanese Patent O.P.I. Publication No. 4-218044. Further specific examples thereof include aldehyde based hardeners (e.g., formaldehyde), aziridine based hardeners, epoxy based hardeners, vinyl sulfone based hardeners {e.g., N,N'-ethylene-bis(vinyl-sulfonylacetamido)ethane}, N-methylol based hardeners (e.g., dimethylol urea), boric acid, metaboric acid, and polymer hardeners (compounds described, for example, in Japanese Patent O.P.I. Publication No. 62-234157). When gelatin is used as an aqueous compound, of such hardeners, vinyl sulfone based hardeners and chlorotriazine based hardeners are preferably used singly or in combination. Further, when polyvinyl alcohol is used, boron-containing compounds such as boric acid or metaboric acid are preferably used.

Any of these hardeners is used in the range of 0.001-1 g per 1 g of an aqueous compound, and preferably in the range of 0.005-0.5 g per 1 g of an aqueous compound. Further, to enhance film strength, a heat treatment or humidity adjustment during curing reaction is possible to be carried out.
(Electron Insulation Layer)

In an electrochemical display element of the present invention, an electron insulation layer can be provided.

The electron insulation layer applicable to the present invention may be a layer exhibiting ion conductivity together with electron insulation. Examples thereof include a solid electrolyte film for which a polymer or a salt having a polar group is prepared in the form of a film, a quasi-solid electrolyte film in which an electrolyte is supported in a porous film with high electron insulation and its pores, a polymer porous film having pores, and a porous body made of an inorganic material exhibiting low specific permittivity such as a silicon-containing compound.

As a method of forming a porous film, there can be used any of commonly known formation methods such as a firing method (a fusion method) (polymer fine particles or inorganic particles are added to a binder and partially fused, and then pores having been generated among particles are utilized), an extraction method (a constituent layer is formed of an organic or inorganic substance soluble in a solvent and a binder insoluble in the solvent, and then the organic or inorganic substance is dissolved with the solvent to obtain fine pores), a foaming method in which a polymer is allowed to foam by heating or degassing, a phase conversion method in which a mixture of polymers is phase-separated via manipulation of a good solvent and a poor solvent, or a radiation irradiation method to form fine pores via irradiation of various kinds of radiations. Specifically, there are listed electron insulation layers described in Japanese Patent O.P.I. Publication No. 10-30181 and Japanese Patent O.P.I. Publication No. 2003-107626, Japanese Patent Examined Publication No. 7-95403, Japanese Patent Publication No. 2635715, Japanese Patent Publication No. 2849523, Japanese Patent Publication No. 2987474, Japanese Patent Publication No. 3066426, Japanese Patent Publication No. 3464513, Japanese Patent Publication No. 3483644, Japanese Patent Publication No. 3535942, and Japanese Patent Publication No. 3062203.
[Thickener Added into Electrolyte]

In the electrochemical display element of the present invention, thickeners can be used for the electrolyte. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly (vinyl butyral), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, polyacrylic acid, and polyurethane as a transparent hydrophobic binder.

These thickeners may be used in combination with at least two kinds. There are further cited the compounds described on pages 71-75 of Japanese Patent O.P.I. Publication No. 64-13546. Of these, polyvinyl alcohols, polyvinylpyrrolidones, hydroxypropyl celluloses, and polyalkylene glycols are preferably used in view of compatibility with various types of additives and enhancement of dispersion stability of white particles.
[Other Additives]

Examples of layers of structure for the electrochemical display element of the present invention include auxiliary layers such as a protective layer, a filter layer, an antihalation layer, a crossover light cutting layer and a backing layer. These auxiliary layers may contain chemical sensitizers, noble metal sensitizers, photosensitive dyes, supersensitizers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbents, anti-irradiation dyes, filter light absorbing dyes, fungicides, polymer latexes, heavy metals, antistatic agents and matting agents, if desired.

The additives described above are detailed in Research Disclosure (hereinafter denoted simply as RD) Volume 176 Item/17643 (December 1978), RD Volume 184 Item/18431 (August 1979), RD Volume 187 Item/18716 (November 1979), and RD Volume 308 Item/308119 (December 1989).

Kinds of compounds and sections thereof disclosed in these 3 RDs are listed below.

TABLE 1

| | Additives | | | | |
|---|---|---|---|---|---|
| | RD 17643 | | RD 18716 | RD 308119 | |
| Items | Page | Section | Page | Page | Section |
| Chemical sensitizer | 23 | III | 648 right top | 996 | III |
| Sensitizing dye | 23 | IV | 648, 649 | 996-998 | IV |

TABLE 1-continued

|  | Additives | | | | |
| --- | --- | --- | --- | --- | --- |
|  | RD 17643 | | RD 18716 | RD 308119 | |
| Items | Page | Section | Page | Page | Section |
| Desensitizing dye | 23 | IV | — | 998 | IV |
| Dye | 25, 26 | VIII | 649, 650 | 1003 | VIII |
| Development accelerator | 29 | XXI | 648 right top | — | — |
| Antifoggant stabilizer | 24 | IV | 649 right top | 1006, 1007 | VI |
| Optical brightening agent | 24 | VIII | — | 998 | V |
| Hardener | 26 | XXI | 651 left | 1004, 1005 | X |
| Surfactant | 26, 27 | XI | 650 right | 1005, 1006 | XI |
| Antistatic agent | 27 | XII | 650 right | 1006, 1007 | XIII |
| Plasticizer | 27 | XII | 650 right | 1006 | XII |
| Lubricant | 27 | XII | — | — | — |
| Matting agent | 28 | XVI | 650 right | 1008, 1009 | XVI |
| Binder | 26 | XXII | — | 1003, 1004 | IX |
| Support | 28 | XVII | — | 1009 | XVII |

[Substrate]

There are preferably employed as substrates usable in the present invention, synthetic plastic films composed of polyolefins such as polyethylene or polypropylene, polycarbonates, cellulose acetate, polyethylene terephthalate, polyethylene dinaphthalene dicarboxylate, polystyrene naphthalates, polyvinyl chloride, polyimide, polyvinyl acetals, and polystyrene. In addition, preferred are syndioctatic structure polystyrenes. These are prepared employing the methods described, for example, in each of Japanese Patent O.P.I. Publication No. 62-117708, Japanese Patent O.P.I. Publication No. 1-46912, and Japanese Patent O.P.I. Publication No. 1-178505. Further, examples of supports include metal substrates including stainless steel, paper supports such as baryta paper or resin coated paper, supports including the above plastic film having thereon a reflection layer, and those which are described in Japanese Patent O.P.I. Publication No. 62-253195 (pages 29-31) as a support. There are also preferably used those described on page 28 of RD No. 17643, from the right column on page 647 to the left column on page 648 of RD No. 18716, and on page 879 of RD No. 307105. As described in U.S. Pat. No. 4,141,735, these supports may be subjected to a thermal treatment at a temperature lower than Tg so that core-set curl is decreased. Further, the surface of these supports may be subjected to a surface treatment with the aim of enhancement of adhesion of the support to other constituting layers. In the invention, there may be employed as surface treatments a glow discharge treatment, an ultraviolet radiation irradiation treatment, a corona treatment and a flame treatment. Further there may be employed supports described on pages 44-149 of Kochi Gijutsu No. 5 (published by AZTEC Corp., dated Mar. 22, 1991). There are further cited "Supports" described on page 1009 of RD No. 308119 and on page 108 of Product Licensing Index Volume 92. In addition, there are also usable glass substrates and epoxy resins kneaded with glass powder.

[Other Constituent Elements of Electrochemical Display Element]

The display element of the present invention may optionally employ sealing agents, column-structure materials, and spacer particles.

Sealing agents are those to seal materials so that they do not leak out, and also called sealers. Usable are curing type, thermosetting type, photo-curing type, moisture curing type, and anaerobic curing type such as epoxy resins, urethane resins, acryl resins, vinyl acetate resins, ene-thiol resins, silicone resins, or modified polymer resins.

Columnar structure materials provide strong self-supporting (strength) between substrates. Examples thereof include a cylindrical form, a quadrangular form, an elliptic cylindrical form and a trapezoidal form, which are arranged at definite intervals in a specified pattern such as a lattice. Further, there may be employed stripe-shaped ones arranged at definite intervals. It is preferable that the columnar structure materials are not randomly arranged, but arranged at equal intervals, arranged so as to vary the interval gradually, or arranged so as to repeat a predetermined pattern at a definite cycle so that the distance between substrates is appropriately maintained and image display is not hindered. When 1-40% of the display region of an electrochemical display element is occupied by the columnar structure material, sufficient strength for commercial viability is achieved for an electrochemical display element.

There may be provided a spacer between a pair of substrates to maintain a uniform gap between them. Examples of such a spacer include a spherical material composed of a resins or inorganic oxide. Further, adhesion spacers are suitably employed the surface of which is coated with thermoplastic resins. In order to maintain the uniform gap between substrates, there may be provided only columnar structure materials. However, there may be provided both spacers and columnar structure materials. In place of the columnar structure materials, only spacers may be employed as a space-holding member. The diameter of spacers, when a columnar structure material is formed, is not more than its height, and is preferably equal to the height. When no columnar structure material is formed, the diameter of spacers corresponds to the thickness of the cell gap.

(Method of Driving Electrochemical Display Element)

A controlling method of a transparent state and a colored state of the electrochemical display element in the present invention is preferably determined based on the redox potential of a compound represented by Formula (L), and deposition overvoltage of silver ions.

For example, when an electrochemical display element has a compound represented by Formula (L) and a silver compound between a pair of facing electrodes, a colored state other than black is expressed on the oxidation side and a black state is expressed on the reduction side. As one example of a controlling method in this case, there is exemplified a method in which a voltage higher than the redox potential of a compound represented by Formula (L) is applied and then the compound represented by Formula (L) is oxidised to express a colored state other than black; a voltage somewhere between the redox potential of the compound represented by Formula (L) and the deposition overvoltage of a silver salt compound is applied and then the compound represented by Formula (L) is reduced to return to a white state; a voltage lower than the deposition overvoltage of the silver salt compound is applied and then silver is deposited on the electrode to express a black state; and a voltage somewhere between the oxidation potential of the deposited silver and the redox potential of the compound represented by Formula (L) is applied and then the deposited silver is dissolved for decoloration.

A driving operation of the electrochemical display element of the present invention may be a simple matrix drive or active matrix drive. The simple matrix drive referred to in the present invention refers to a driving method in which electrical current is sequentially applied to a circuit formed by vertically crossing of a positive line containing plural positive electrodes to a facing negative line containing plural negative electrodes. The use of such a simple matrix drive has the advantage that the circuit structure and the driving IC are capable of being simplified to reduce the production cost. The active matrix drive refers to a driving method using TFT circuits in which scanning lines, data lines, and current supplying lines are formed in a grid manner and the TFT circuits are positioned in each of the grids. The active matrix drive is advantageous in gradation and memory functions since a switching function can be allocated to each pixel. The circuit described, for example, in FIG. 5 of Japanese Patent O.P.I. Publication No. 2004-29327 is employable.

(Application to Products)

The electrochemical display element of the present invention is applied to fields including electronically published books, ID cards, public use, transportation, broadcasting, financial clearance, and distribution and logistics. Specific examples include door keys, student ID cards, employee ID cards, various membership cards, convenience store cards, department store cards, vending machine cards, gas station cards, subway and railroad cards, bus cards, cashing cards, credit cards, highway cards, driver's license cards, hospital consultation cards, electronic medical charts, health insurance cards, basic resident registers, passports, and electronic books.

EXAMPLE

Example 1

<<Preparation of Electrode>>
(Preparation of Electrode 1)

An ITO (Indium Tin Oxide) film having a pitch of 145 μm and an electrode width of 130 μm was formed on a glass substrate having a thickness of 1.5 mm and a size of 2 cm×4 cm by a commonly known method to obtain a transparent electrode (electrode 1).

(Preparation of Electrode 2)

A nickel electrode having an electrode thickness of 0.1 μm, a pitch of 145 μm and an electrode width of 130 μm was formed on a glass substrate having a thickness of 1.5 mm and a size of 2 cm×4 cm by a commonly known method, and the resulting electrode was further immersed in a substitution gold plating bath to obtain a gold-nickel electrode in gold substitution by a depth of 0.05 μm from the electrode surface.

(Preparation of Electrode 3)

A titanium dioxide film (about 4-10 particles having an average particle diameter of 17 nm, having been subjected to necking) having a thickness of 5 μm was further formed on electrode 2 to obtain electrode 3.

(Preparation of Electrode 4)

Ink liquid 1 was provided on electrode 3 at 120 dpi employing an ink-jet apparatus equipped with a piezo-system head to prepare electrode 4. In addition, "dpi" described in the present invention means the number of dots per 2.54 cm.

(Preparation of Electrode 5)

Ink liquid 2 described below was provided on electrode 3 at 120 dpi employing the ink-jet apparatus equipped with a piezo-system head to prepare electrode 5.

(Preparation of Electrode 6)

A titanium dioxide film (about 4-10 particles having an average particle diameter of 17 nm, having been subjected to necking) having a thickness of 5 μm was formed on electrode 1 described in Example 1, and Ink liquid 3 described below was provided on the electrode at 120 dpi employing an ink-jet apparatus equipped with a piezo head to prepare electrode 4 to prepare electrode 6.

(Preparation of Electrodes 7-9)

Electrodes 7-9 were prepared similarly to preparation of electrode 6, except that ink liquid 3 was replaced by each of ink liquids 4-6.

(Preparation of Electrode 10)

Electrode 10 in which a radical polymer was immobilized was prepared in accordance with paragraph No. [0048] of Japanese Patent O.P.I. Publication No. 2007-298713.

<Preparation of Ink liquids 1-6>

An EC dye and an exemplified compound are dissolved in an acetonitrile/ethanol mixture solvent (1/1) to prepare each of ink liquids 1-6 so as to give the concentration as shown in the following Table 2.

TABLE 2

| Ink liquid | EC dye | | Exemplified compound | |
|---|---|---|---|---|
| Ink 1 | None | — | B-34 | 3 mmol/liter |
| Ink 2 | None | — | B-31 | 3 mmol/liter |
| Ink 3 | EC-1 | 3 mmol/liter | None | — |
| Ink 4 | L1 | 3 mmol/liter | None | — |
| Ink 5 | L6 | 3 mmol/liter | None | — |
| Ink 6 | L16 | 3 mmol/liter | None | — |

EC-1 represents bis-(2-phosphonoethyl)-4,4'-bipyridium dibromide.

[Preparation of Electrolyte Solution]
(Preparation of Electrolyte Solutions 1-12)

With compositions shown in the following Table 3, a supporting salt and an additive are added into each solvent to prepare each of electrolytes 1-12.

TABLE 3

| Electrolyte | Solvent | | Supporting salt | | Additive 1 | |
|---|---|---|---|---|---|---|
| 1 | DMSO | 2.5 g | Bu$_4$NClO$_4$ | 0.025 g | None | — |
| 2 | DMSO | 2.5 g | Bu$_4$NClO$_4$ | 0.025 g | TEMPO | 0.1 g |
| 3 | DMSO | 2.5 g | Bu$_4$NClO$_4$ | 0.025 g | B-1 | 0.1 g |
| 4 | S1-4 | 2.5 g | SBP | 0.025 g | None | — |
| 5 | S1-4 | 2.5 g | SBP | 0.025 g | TEMPO | 0.1 g |
| 6 | S1-4 | 2.5 g | SBP | 0.025 g | TEMPO | 0.01 g |
| 7 | S1-4 | 2.5 g | SBP | 0.025 g | B-1 | 0.01 g |
| 8 | S1-4 | 2.5 g | SBP | 0.025 g | B-16 | 0.01 g |
| 9 | S1-4 | 2.5 g | SBP | 0.025 g | B-34 | 0.01 g |
| 10 | S1-4 | 2.5 g | SBP | 0.025 g | B-31 | 0.01 g |
| 11 | S2-1 | 2.5 g | SBP | 0.025 g | B-34 | 0.01 g |
| 12 | S2-1 | 2.5 g | SBP | 0.025 g | B-31 | 0.01 g |

TEMPO represents 2,2,6,6-tetramethylpiperidine 1-oxyl. SBP represents tetrafluoroborate spiro-(1,1')-bipyrrolidinium.

(Preparation of Electrolyte Solutions 13-21)

With compositions shown in the following Table 4, a supporting salt, a metal salt compound and each additive are added into each solvent to prepare each of electrolytes 13-21.

TABLE 4

| | Solvent | | Supporting salt | | Additive 1 | | Metal salt compound | | Additive 2 | |
|---|---|---|---|---|---|---|---|---|---|---|
| 13 | S1-4 | 2.5 g | SBP | 0.025 g | None | — | Silver p-toluene sulfonate | 0.1 g | G1-2 | 0.2 g |

TABLE 4-continued

| | Solvent | Supporting salt | Additive 1 | | Metal salt compound | | Additive 2 | |
|---|---|---|---|---|---|---|---|---|
| 14 | S1-4 | 2.5 g SBP | 0.025 g TEMPO | 0.1 g | Silver p-toluene sulfonate | 0.1 g | G1-2 | 0.2 g |
| 15 | S1-4 | 2.5 g SBP | 0.025 g TEMPO | 0.01 g | Silver p-toluene sulfonate | 0.1 g | G1-2 | 0.2 g |
| 16 | S1-4 | 2.5 g SBP | 0.025 g B-1 | 0.01 g | Silver p-toluene sulfonate | 0.1 g | G1-2 | 0.2 g |
| 17 | S1-4 | 2.5 g SBP | 0.025 g B-16 | 0.01 g | Silver p-toluene sulfonate | 0.1 g | G1-2 | 0.2 g |
| 18 | S1-4 | 2.5 g SBP | 0.025 g B-34 | 0.01 g | Silver p-toluene sulfonate | 0.1 g | G1-2 | 0.2 g |
| 19 | S1-4 | 2.5 g SBP | 0.025 g B-31 | 0.01 g | Silver p-toluene sulfonate | 0.1 g | G1-2 | 0.2 g |
| 20 | S2-1 | 2.5 g SBP | 0.025 g B-34 | 0.01 g | Silver p-toluene sulfonate | 0.1 g | G1-2 | 0.2 g |
| 21 | S2-1 | 2.5 g SBP | 0.025 g B-31 | 0.01 g | Silver p-toluene sulfonate | 0.1 g | G1-2 | 0.2 g |

<<Preparation of Electrochemical Display Element>>
(Preparation of Electrochemical Display Element 1-1)

A mixed solution in which 20% by weight of titanium dioxide CR-90 (produced by Ishihara Sangyo Kaisha, Ltd.) were added into an isopropanol solution containing 2% by weight of polyvinyl alcohol (an average polymerization degree of 3500 and a saponification degree of 87%), followed by being dispersed employing an ultrasonic homogenizer, was coated on electrode 2 whose peripheral portion was edged with an olefin sealant containing a glass-made spherical bead spacer having an average particle diameter of 40 μm at a volume fraction of 10% for the peripheral portion around the range of 2 cm×2 cm of a glass substrate center portion, followed by drying at 15° C. for 30 minutes for vaporization of the solvent, and subsequently drying at 45° C. for one hour. A glass-made spherical bead spacer having an average particle diameter of 20 μm was spread on the resulting titanium dioxide layer, and electrode 2 and electrode 6 were subsequently bonded so as to be normal to each other to prepare an empty cell via heat-pressing. Electrolyte solution 1 was vacuum-injected into the empty cell, and the inlet was sealed with a UV curable epoxy based resin to prepare electrochemical display element 1-1.

<<Preparation of Electrochemical Display Elements 1-2 to 1-21>>

Electrochemical display elements 1-2 to 1-21 each were prepared similarly to preparation of the above-described electrochemical display element 1-1, except that the structure of the electrolyte solution and the electrode was replaced by each structure described in Table 5.

TABLE 5

| Element No. | Electrolyte solution | Display electrode | Facing electrode |
|---|---|---|---|
| 1-1 | Electrolyte solution 1 | Electrode 6 | Electrode 2 |
| 1-2 | Electrolyte solution 2 | Electrode 6 | Electrode 2 |
| 1-3 | Electrolyte solution 3 | Electrode 6 | Electrode 2 |
| 1-4 | Electrolyte solution 4 | Electrode 7 | Electrode 2 |
| 1-5 | Electrolyte solution 5 | Electrode 7 | Electrode 2 |
| 1-6 | Electrolyte solution 6 | Electrode 7 | Electrode 2 |
| 1-7 | Electrolyte solution 7 | Electrode 7 | Electrode 2 |
| 1-8 | Electrolyte solution 8 | Electrode 7 | Electrode 2 |
| 1-9 | Electrolyte solution 9 | Electrode 7 | Electrode 2 |
| 1-10 | Electrolyte solution 10 | Electrode 7 | Electrode 2 |
| 1-11 | Electrolyte solution 4 | Electrode 7 | Electrode 4 |
| 1-12 | Electrolyte solution 4 | Electrode 7 | Electrode 5 |
| 1-13 | Electrolyte solution 5 | Electrode 8 | Electrode 2 |
| 1-14 | Electrolyte solution 9 | Electrode 8 | Electrode 2 |
| 1-15 | Electrolyte solution 10 | Electrode 8 | Electrode 2 |
| 1-16 | Electrolyte solution 5 | Electrode 9 | Electrode 2 |
| 1-17 | Electrolyte solution 9 | Electrode 9 | Electrode 2 |
| 1-18 | Electrolyte solution 10 | Electrode 9 | Electrode 2 |
| 1-19 | Electrolyte solution 4 | Electrode 7 | Electrode 10 |
| 1-20 | Electrolyte solution 11 | Electrode 7 | Electrode 4 |
| 1-21 | Electrolyte solution 12 | Electrode 7 | Electrode 5 |

<<Evaluation 1: Electrochemical Display Elements 1-1, 1-2 and 1-3>>
[Evaluation of Stability in Reflectance During Repetitive Driving]

Both electrodes of the resulting electrochemical display element were connected to both terminals of a constant-voltage power supply, respectively, and a voltage of +1.5 V was applied there for 1.5 seconds, followed by application of a voltage of −1.5 V for 1 second to make colored display. Reflectance at a maximum absorption wavelength in the visible light region in this case was determined with a spectrophotometer CM-3700d (manufactured by Konica Minolta Sensing, Inc.). Driving was carried out 10 times in total under the same driving conditions, and then the average value of the resulting reflectances was designated as $R_{ave1}$. Further, repetitive driving was carried out 10000 times under the same driving conditions to determine $R_{ave2}$. $R_{COLOR1}=|R_{ave2}-R_{ave1}|$ was set, and $R_{COLOR1}$ was designated as an indicator for stability in reflectance during repetitive driving. Herein, the smaller value of $R_{COLOR1}$, the more excellent stability in reflectance during repetitive driving is.

<<Evaluation 2: Evaluation of Electrochemical Display Elements 1-4 to 1-21 >>
[Evaluation of Stability in Reflectance During Repetitive Driving]

Each of electrochemical display elements 1-4 to 1-21 was evaluated similarly to the above-described Evaluation 1, except that a voltage of −1.5 V was applied for 1.5 seconds, followed by application of a voltage of +1.5 V for 1 second to make colored display.

<<Evaluation 3: Evaluation of Stability with Respect to Storage for a Long Duration for Electrochemical Display Elements 1-1 to 1-21 >>

Each of the electrochemical display elements was stored at 65° C. for 432 hours, and evaluations were made in accordance with methods in Evaluation 1 and Evaluation 2 corresponding to each of them.

Evaluation results of each electrochemical display element, having been obtained as described above are shown in Table 6.

TABLE 6

| | TEMPO compound or bicyclo compound | | EC compound | Electrolyte solution | | Setting of electrode | | Evaluation result $R_{COLOR1}$ (%) | Evaluation result (after storage at 65° C. for 432 hours) $R_{COLOR1}$ (%) | Remarks |
|---|---|---|---|---|---|---|---|---|---|---|
| No. | Name | Supporting method | | No. | Solvent | on the display side | on the facing side | | | |
| 1-1 | — | — | EC-1 | 1 | DMSO | 6 | 2 | 26 | 30 | Comp. |
| 1-2 | TEMPO | Added in electrolyte solution | EC-1 | 2 | DMSO | 6 | 2 | 20 | 29 | Comp. |
| 1-3 | B-1 | Added in electrolyte solution | EC-1 | 3 | DMSO | 6 | 2 | 9 | 12 | Inv. |
| 1-4 | — | — | (L1) | 4 | S1-4 | 7 | 2 | 24 | 28 | Comp. |
| 1-5 | TEMPO | Added in electrolyte solution | (L1) | 5 | S1-4 | 7 | 2 | 16 | 26 | Comp. |
| 1-6 | TEMPO | Added in electrolyte solution | (L1) | 6 | S1-4 | 7 | 2 | 23 | 26 | Comp. |
| 1-7 | B-1 | Added in electrolyte solution | (L1) | 7 | S1-4 | 7 | 2 | 3 | 4 | Inv. |
| 1-8 | B-16 | Added in electrolyte solution | (L1) | 8 | S1-4 | 7 | 2 | 3 | 5 | Inv. |
| 1-9 | B-34 | Added in electrolyte solution | (L1) | 9 | S1-4 | 7 | 2 | 2 | 2 | Inv. |
| 1-10 | B-31 | Added in electrolyte solution | (L1) | 10 | S1-4 | 7 | 2 | 3 | 2 | Inv. |
| 1-11 | B-34 | Immobilized on electrode | (L1) | 4 | S1-4 | 7 | 4 | 11 | 11 | Inv. |
| 1-12 | B-31 | Immobilized on electrode | (L1) | 4 | S1-4 | 7 | 5 | 12 | 11 | Inv. |
| 1-13 | TEMPO | Added in electrolyte solution | (L6) | 5 | S1-4 | 8 | 2 | 15 | 27 | Comp. |
| 1-14 | B-34 | Added in electrolyte solution | (L6) | 9 | S1-4 | 8 | 2 | 2 | 2 | Inv. |
| 1-15 | B-31 | Added in electrolyte solution | (L6) | 10 | S1-4 | 8 | 2 | 2 | 2 | Inv. |
| 1-16 | TEMPO | Added in electrolyte solution | (L16) | 5 | S1-4 | 9 | 2 | 14 | 30 | Comp. |
| 1-17 | B-34 | Added in electrolyte solution | (L16) | 9 | S1-4 | 9 | 2 | 2 | 3 | Inv. |
| 1-18 | B-31 | Added in electrolyte solution | (L16) | 10 | S1-4 | 9 | 2 | 2 | 2 | Inv. |
| 1-19 | Radical polymer | Immobilized on electrode | (L1) | 4 | S1-4 | 7 | 10 | 7 | 28 | Comp. |
| 1-20 | B-34 | Added in electrolyte solution | (L1) | 11 | S2-1 | 7 | 2 | 2 | 3 | Inv. |
| 1-21 | B-31 | Added in electrolyte solution | (L1) | 12 | S2-1 | 7 | 2 | 2 | 2 | Inv. |

EC compound: Electrochromic compound, Comp.: Comparative example, Inv.: Present invention As is clear from Table 6, it is to be understood that the electrochemical display elements satisfying the structure of the present invention exhibit more improved stability in reflectance during repetitive driving than that of each of the comparative examples.

Example 2

The electrode, ink and electrolyte solution obtained in Example 1 were similarly used in Example 2.

<<Preparation of Electrochemical Display Element>>

(Preparation of Electrochemical Display Element 1-1)

A mixed solution in which 20% by weight of titanium dioxide CR-90 (produced by Ishihara Sangyo Kaisha, Ltd.) were added into an isopropanol solution containing 2% by weight of polyvinyl alcohol (an average polymerization degree of 3500 and a saponification degree of 87%), followed by being dispersed employing an ultrasonic homogenizer, was coated on electrode 2 whose peripheral portion was edged with an olefin sealant containing a glass-made spherical bead spacer having an average particle diameter of 40 µm at a volume fraction of 10% for the peripheral portion around the range of 2 cm×2 cm of a glass substrate center portion, followed by drying at 15° C. for 30 minutes for vaporization of the solvent, and subsequently drying at 45° C. for one hour. A glass-made spherical bead spacer having an average particle diameter of 20 µm was spread on the resulting titanium dioxide layer, and electrode 2 and electrode 7 were subsequently bonded so as to be normal to each other to prepare an empty cell via heat-pressing. Electrolyte solution 13 was vacuum-injected into the empty cell, and the inlet was sealed with a UV curable epoxy based resin to prepare electrochemical display element 2-1.

<<Preparation of Electrochemical Display Elements 2-2 to 2-18>>

Electrochemical display elements 2-2 to 2-18 each were prepared similarly to preparation of the above-described electrochemical display element 2-1, except that the structure of the electrolyte solution and the electrode was replaced by each structure described in Table 7.

TABLE 7

| Element No. | Electrolyte solution | Display electrode | Facing electrode |
|---|---|---|---|
| 2-1 | Electrolyte solution 13 | Electrode 7 | Electrode 2 |
| 2-2 | Electrolyte solution 14 | Electrode 7 | Electrode 2 |
| 2-3 | Electrolyte solution 15 | Electrode 7 | Electrode 2 |
| 2-4 | Electrolyte solution 16 | Electrode 7 | Electrode 2 |
| 2-5 | Electrolyte solution 17 | Electrode 7 | Electrode 2 |
| 2-6 | Electrolyte solution 18 | Electrode 7 | Electrode 2 |
| 2-7 | Electrolyte solution 19 | Electrode 7 | Electrode 2 |
| 2-8 | Electrolyte solution 13 | Electrode 7 | Electrode 4 |
| 2-9 | Electrolyte solution 13 | Electrode 7 | Electrode 5 |
| 2-10 | Electrolyte solution 14 | Electrode 8 | Electrode 2 |
| 2-11 | Electrolyte solution 18 | Electrode 8 | Electrode 2 |
| 2-12 | Electrolyte solution 19 | Electrode 8 | Electrode 2 |
| 2-13 | Electrolyte solution 14 | Electrode 9 | Electrode 2 |
| 2-14 | Electrolyte solution 18 | Electrode 9 | Electrode 2 |
| 2-15 | Electrolyte solution 19 | Electrode 9 | Electrode 2 |
| 2-16 | Electrolyte solution 13 | Electrode 7 | Electrode 10 |
| 2-17 | Electrolyte solution 20 | Electrode 7 | Electrode 2 |
| 2-18 | Electrolyte solution 21 | Electrode 7 | Electrode 2 |

<<Evaluation of Electrochemical Display Element>>

[Evaluation of Stability in Reflectance During Repetitively Driving]

Both electrodes of the resulting electrochemical display element were connected to both terminals of a constant-voltage power supply, respectively, and a voltage of -1.5 V was applied there for 1.5 seconds, followed by application of a wavelength of 550 nm during gray displaying and a voltage of +1.5 V for 1.5 seconds to make colored display. Reflectance at a maximum absorption wavelength in the visible light region in this case was determined with a spectrophotometer CM-3700d (manufactured by Konica Minolta Sensing, Inc.). Driving was carried out 10 times in total under the same driving conditions, and an average value of the resulting gray reflectances and another average value of reflectances in the colored state were separately calculated and designated as $R_{ave3}$ and $R_{ave4}$, respectively. Further, repetitive driving was carried out 10000 times under the same driving conditions to determine $R_{ave5}$ and $R_{ave6}$. $R_{BK} = |R_{ave5} - R_{ave3}|$ and $R_{COLOR2} = |R_{ave6} - R_{ave4}|$ were set, and $R_{BK}$ and $R_{COLOR2}$ were designated as indicators for stability in reflectance during repetitive driving. Herein, the smaller value of each of $R_{BK}$ and $R_{COLOR2}$, the more excellent stability in reflectance during repetitive driving is. Further, each of the electrochemical display elements was stored at 65° C. for 432 hours, and evaluations were similarly made for each of them.

Evaluation results and setting of each electrochemical display element, having been obtained as described above are shown in Table 8.

TABLE 8

| No. | TEMPO compound or bicyclo compound Name | Supporting method | EC compound | Electrolyte solution Metal salt No. compound | Additive | Solvent | Setting of electrode on the display side | on the facing side | Evaluation result $R_{BK}$ (%) | $R_{COLOR2}$ (%) | Evaluation result (after storage at 65° C. for 432 hours) $R_{BK}$ (%) | $R_{COLOR2}$ (%) | Remarks |
|---|---|---|---|---|---|---|---|---|---|---|---|---|---|
| 2-1 | — | — | (L1) | 13 Silver tosylate | G2-12 | S1-4 | 7 | 2 | 24 | 27 | 28 | 30 | Comp. |
| 2-2 | TEMPO | *1 | (L1) | 14 Silver tosylate | G2-12 | S1-4 | 7 | 2 | 17 | 16 | 27 | 29 | Comp. |
| 2-3 | TEMPO | *1 | (L1) | 15 Silver tosylate | G2-12 | S1-4 | 7 | 2 | 18 | 20 | 30 | 31 | Comp. |
| 2-4 | B-1 | *1 | (L1) | 16 Silver tosylate | G2-12 | S1-4 | 7 | 2 | 8 | 8 | 4 | 2 | Inv. |
| 2-5 | B-16 | *1 | (L1) | 17 Silver tosylate | G2-12 | S1-4 | 7 | 2 | 9 | 9 | 4 | 3 | Inv. |
| 2-6 | B-34 | *1 | (L1) | 18 Silver tosylate | G2-12 | S1-4 | 7 | 2 | 7 | 6 | 2 | 3 | Inv. |
| 2-7 | B-31 | *1 | (L1) | 19 Silver tosylate | G2-12 | S1-4 | 7 | 2 | 7 | 6 | 3 | 3 | Inv. |
| 2-8 | B-34 | Immobilized on electrode | (L1) | 13 Silver tosylate | G2-12 | S1-4 | 7 | 4 | 2 | 2 | 8 | 8 | Inv. |
| 2-9 | B-31 | Immobilized on electrode | (L1) | 13 Silver tosylate | G2-12 | S1-4 | 7 | 5 | 3 | 2 | 9 | 10 | Inv. |
| 2-10 | TEMPO | *1 | (L6) | 14 Silver tosylate | G2-12 | S1-4 | 8 | 2 | 10 | 11 | 30 | 30 | Comp. |
| 2-11 | B-34 | *1 | (L6) | 13 Silver tosylate | G2-12 | S1-4 | 8 | 2 | 2 | 2 | 2 | 2 | Inv. |
| 2-12 | B-31 | *1 | (L6) | 13 Silver tosylate | G2-12 | S1-4 | 8 | 2 | 2 | 2 | 3 | 3 | Inv. |
| 2-13 | TEMPO | *1 | (L16) | 14 Silver tosylate | G2-12 | S1-4 | 9 | 2 | 10 | 9 | 29 | 32 | Comp. |
| 2-14 | B-34 | *1 | (L16) | 13 Silver tosylate | G2-12 | S1-4 | 9 | 2 | 2 | 3 | 2 | 3 | Inv. |
| 2-15 | B-31 | *1 | (L16) | 13 Silver tosylate | G2-12 | S1-4 | 9 | 2 | 2 | 3 | 3 | 3 | Inv. |
| 2-16 | *A | Immobilized on electrode | (L1) | 13 Silver tosylate | G2-12 | S1-4 | 7 | 10 | 11 | 13 | 8 | 30 | Comp. |
| 2-17 | B-34 | *1 | (L1) | 19 Silver tosylate | G2-12 | S2-1 | 7 | 2 | 2 | 3 | 3 | 3 | Inv. |
| 2-18 | B-31 | *1 | (L1) | 20 Silver tosylate | G2-12 | S2-1 | 7 | 2 | 3 | 2 | 4 | 3 | Inv. |

*1: Added in electrolyte solution, *A: Radical polymer, EC compound: Electrochromic compound
Comp.: Comparative example, Inv.: Present invention As is clear from Table 8, it is to be understood that the electrochemical display elements satisfying the structure of the present invention exhibit more improved stability in reflectance during repetitive driving than that of each of the comparative examples.

The invention claimed is:

1. An electrochemical display element comprising an N-oxyl derivative represented by the following Formula (1), an electrolyte and a pair of facing electrodes:

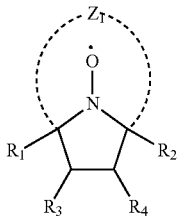

Formula (1)

wherein each of $R_1$, $R_2$, $R_3$ and $R_4$ independently represents a hydrogen atom, an aliphatic hydrocarbon group having a substituent or no substituent, an aromatic hydrocarbon group having a substituent or no substituent, or a heterocyclic group having a substituent or no substituent; $Z_1$ represents a group of atoms having 2 or 3 atoms to form a cyclic structure; and $Z_1$ having a substituent or no substituent.

2. The electrochemical display element, of claim 1, wherein the N-oxyl derivative is immobilized on at least one of the pair of facing electrodes.

3. The electrochemical display element, of claim 1, further comprising a compound represented by the following Formula (L) to conduct a white display or a colored display via driving operation of the pair of facing electrodes:

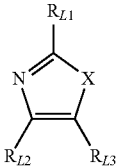

Formula (L)

wherein $R_{L1}$ represents a substituted or unsubstituted aryl group; each of $R_{L2}$ and $R_{L3}$ represents a hydrogen atom or a substituent; and X represents —N($R_{L4}$)—, an oxygen atom or a sulfur atom, wherein $R_{L4}$ represents a hydrogen atom or a substituent.

4. The electrochemical display element of claim 1, comprising a metal salt compound reversibly dissolved and deposited in the electrolyte via electrochemical redox reaction, and the compound represented by Formula (L) to conduct a black display, a white display or a colored display other than black via driving operation of the pair of facing electrodes.

5. The electrochemical display element of claim 4, wherein the metal salt compound is a silver salt compound.

* * * * *